United States Patent
Tsuruta

(10) Patent No.: US 7,996,712 B2
(45) Date of Patent: Aug. 9, 2011

(54) DATA TRANSFER CONTROLLER, DATA CONSISTENCY DETERMINATION METHOD AND STORAGE CONTROLLER

(75) Inventor: Susumu Tsuruta, Odawara (JP)

(73) Assignee: Hitachi, Ltd., Toyko (JP)

( * ) Notice: Subject to any disclaimer, the term of this patent is extended or adjusted under 35 U.S.C. 154(b) by 617 days.

(21) Appl. No.: 12/081,746

(22) Filed: Apr. 21, 2008

(65) Prior Publication Data

US 2009/0210634 A1 Aug. 20, 2009

(30) Foreign Application Priority Data

Feb. 20, 2008 (JP) ................................. 2008-039291

(51) Int. Cl.
*G06F 11/00* (2006.01)

(52) U.S. Cl. ....................... 714/6.21; 714/6.1
(58) Field of Classification Search ................ 714/52, 714/5, 6, 7–13, 5.1, 5.11, 6.1, 6.11, 6.2, 6.21, 714/6.22, 6.23, 6.24, 6.32; 711/141, 144, 711/145

See application file for complete search history.

(56) References Cited

U.S. PATENT DOCUMENTS

| 2004/0148376 | A1* | 7/2004 | Rangan et al. ................ 709/223 |
| 2006/0026345 | A1 | 2/2006 | Nishimoto et al. |
| 2007/0079217 | A1 | 4/2007 | Haugan et al. |
| 2008/0140962 | A1* | 6/2008 | Pattabiraman et al. ....... 711/162 |

FOREIGN PATENT DOCUMENTS

| JP | 2000-347815 | 6/1999 |
| JP | 2006-40011 | 7/2004 |
| JP | 2007-115390 | 9/2006 |

* cited by examiner

*Primary Examiner* — Dieu-Minh Le
(74) *Attorney, Agent, or Firm* — Volpe and Koenig, P.C.

(57) ABSTRACT

A data transfer controller of the present invention can determine whether or not data has been correctly stored in a cache memory even when the data is not transferred to the cache memory in sequential order. Data inputted from a host is transferred to and stored in a prescribed area of the cache memory. First check data is created and stored for each block. A data consistency determination module reads out the data from the cache memory subsequent to the end of a data write, and creates second check data anew. By comparing the second check data against the first check data, it can be determined whether or not the data has been stored normally in the cache memory. The data consistency determination module can also determine the consistency of the data on the basis of the data address written to the cache memory.

12 Claims, 23 Drawing Sheets

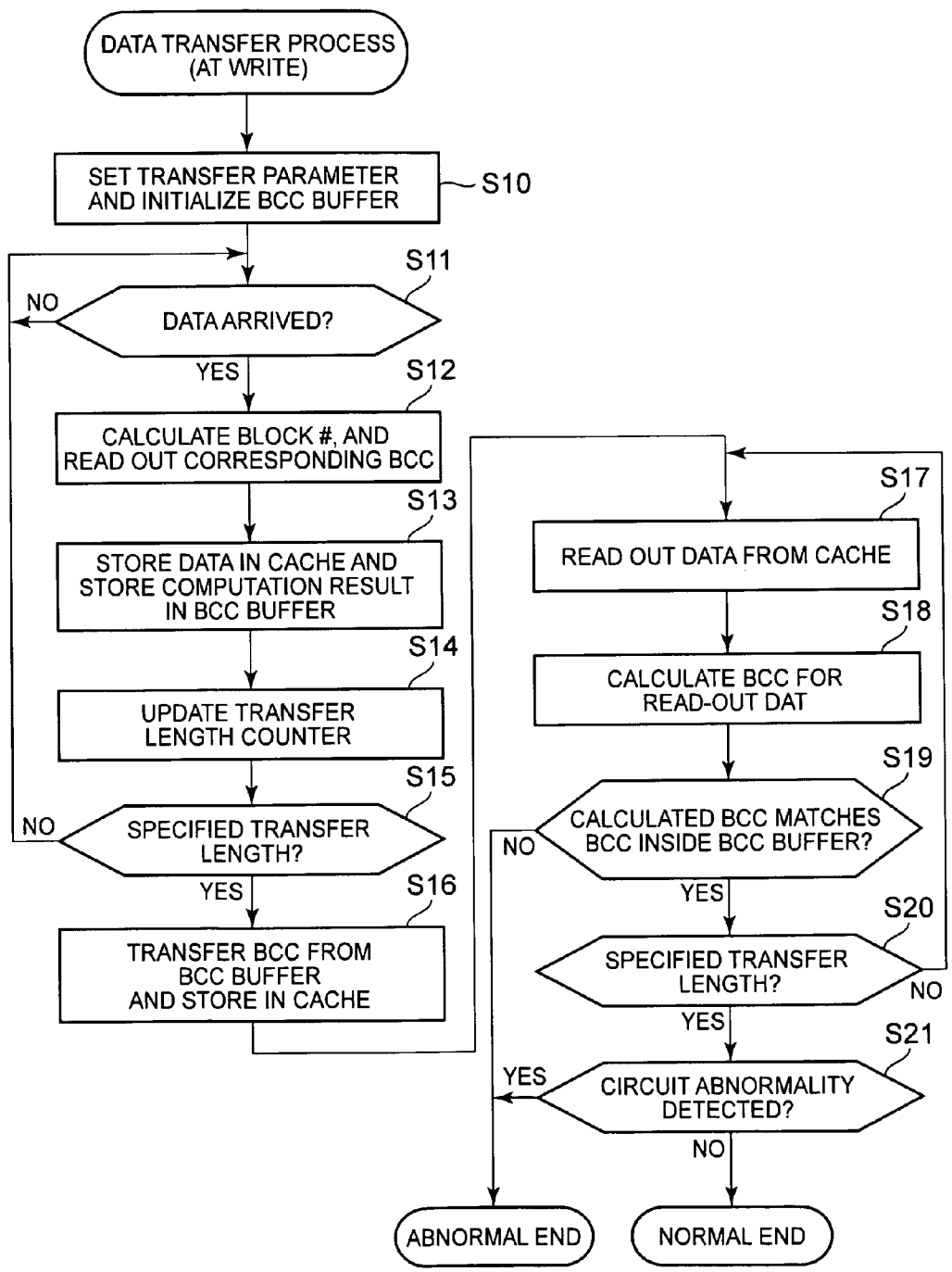

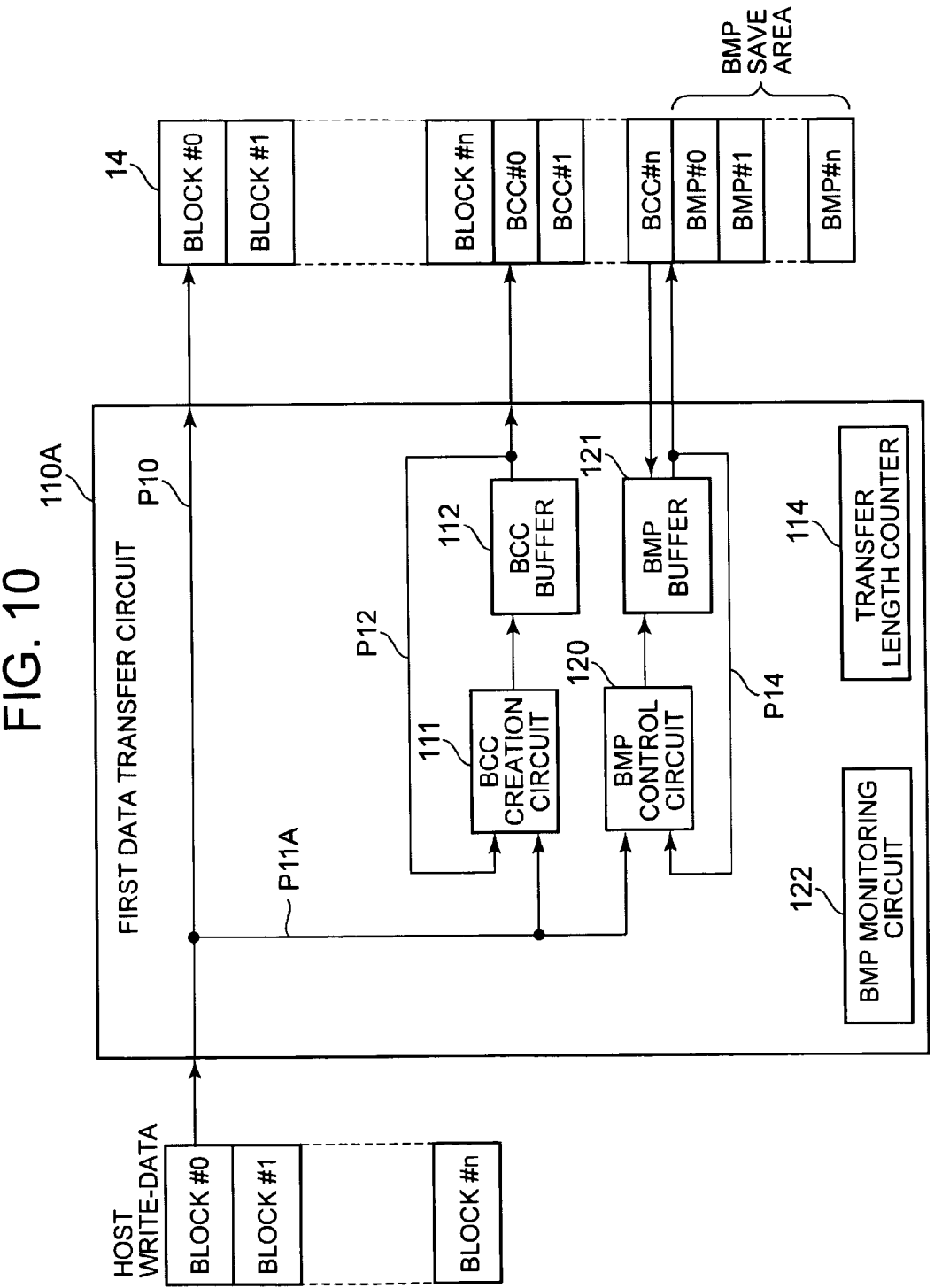

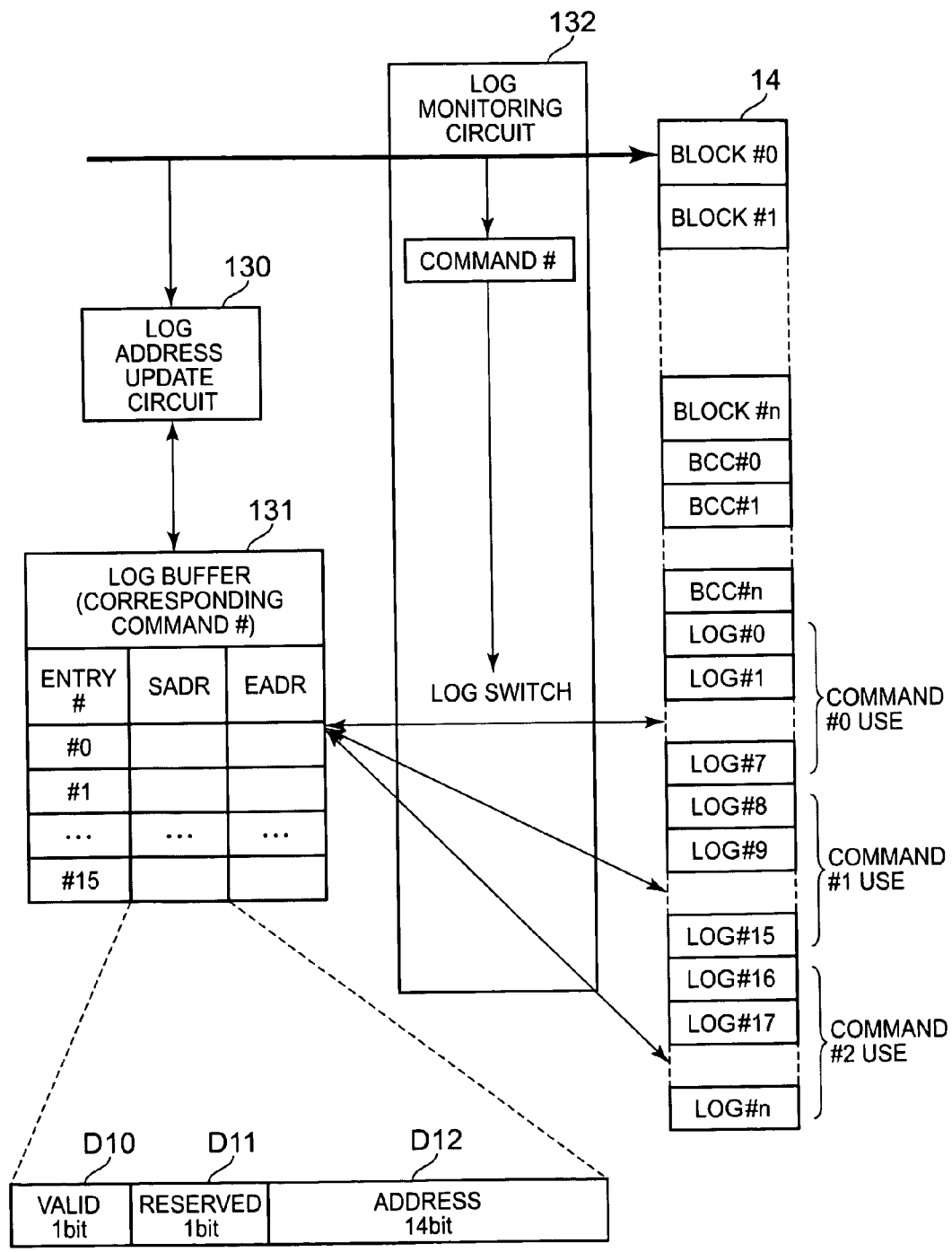

DATA TRANSFER CONTROLLER, DATA
CONSISTENCY DETERMINATION METHOD
AND STORAGE CONTROLLER

CROSS-REFERENCE TO RELATED
APPLICATION

This application relates to and claims the benefit of priority from Japanese Patent Application number 2008-39291, filed on Feb. 20, 2008, the entire disclosure of which is incorporated herein by reference.

BACKGROUND OF THE INVENTION

1. Field of the Invention

The present invention relates to a data transfer controller, a data consistency determination method and a storage controller.

2. Description of the Related Art

A storage controller, for example, is connected to a server, mainframe, or other such host computer (hereinafter, "host"). The storage controller provides the host with a storage area based on RAID (Redundant Array of Inexpensive Disks).

In the storage controller, for example, it is also possible to add redundancy to data, in levels known as RAID 1 through RAID 6. The storage controller prepares for a disk drive failure by either adding parity to data, or writing a copy of the data to a different disk drive.

Furthermore, a storage controller that uses a guarantee code is also known (JP-A-2000-347815). In one prior art, the host computer respectively adds to a logical block as the guarantee code the logical address (hereinafter, "LA (Logical Address)") of the logical block specified as an access destination, and an LRC (Longitudinal Redundancy Check) determined by implementing an exclusive OR operation for the data of the logical block, and saves this guarantee code and logical block to a disk drive. The LA is used to detect an address error in a storage area into which the data of the logical block is written. The LRC is used as an error detection symbol for detecting an error in the logical block data.

However, there may also be situations in which data is not transferred to a cache memory in order. A disorderly transfer state like this is called out-of-order. A method for properly configuring guarantee codes in the respective logical blocks even when an out-of-order state occurs has been proposed (JP-A-2006-40011). Furthermore, a technology related to a memory error correction symbol is also known (JP-A-2007-115390).

In the prior art, a guarantee code can be configured in the logical block even when an out-of-order state occurs. However, this prior art only discloses the guarantee code configuration method; there is absolutely no mention of a method for determining whether or not all data has been transferred to cache memory normally. Therefore, the prior art lacks usability in that it does not make it possible to accurately determine whether or not all the data that should be transferred and stored in cache memory has been received.

SUMMARY OF THE INVENTION

With the foregoing problems in view, an object of the present invention is to provide a data transfer controller, a data consistency determination method, and a storage controller capable of detecting the consistency of data stored in cache memory. Additional objects of the present invention should become clear from the description of the embodiment, which will be explained hereinbelow.

A data transfer controller according to a first aspect of the present invention for solving the above-mentioned problem is for controlling a data transfer to a cache memory when the data transfer to the cache memory can be executed discontinuously, the data transfer controller comprising: a check data creation module for creating check data for detecting a data error in the received data; a check data storage module for temporarily storing the created check data; and a data consistency determination module for determining the consistency of data stored in the cache memory, which determines whether or not the data stored in the cache memory matches a specified size, which is specified beforehand, and whether or not data continuity is maintained.

In a second aspect according to the first aspect, the data consistency determination module compares first check data, which is created when data of the specified size is stored in the cache memory, against second check data, which is created when the data of the specified size is read out from the cache memory, and determines that the data stored in the cache memory has consistency when the first check data matches the second check data.

In a third aspect according to the second aspect, the first check data is created by the check data creation module and stored in the check data storage module, the second check data is created by a data check circuit, and the data check circuit compares the first check data stored in the check data storage module against the second check data, and determines that the data stored in the cache memory has consistency when the first check data matches the second check data.

In a fourth aspect according to the first aspect, the data consistency determination module comprises a bitmap creation module for creating a bitmap for managing the data stored in the cache memory in units of a prescribed size, and a bitmap check module for determining the consistency of the data stored in the cache memory on the basis of the bitmap.

In a fifth aspect according to the first aspect, the data consistency determination module comprises a log manager for managing a log, which shows the address of data stored in the cache memory, and a log check module for determining the consistency of the data stored in the cache memory on the basis of the log.

In a sixth aspect according to the fifth aspect, the log manager updates an address inside the log by comparing the address of data to be transferred to the cache memory against the address of data already stored in the cache memory, and the log check module determines that the data stored in the cache memory has consistency when there is only one entry in the log.

In a seventh aspect according to the first aspect, a work area used by the data consistency determination module is provided in the cache memory.

In an eighth aspect according to the first aspect, the data consistency determination module can also determine whether or not data read out from the cache memory matches a different specified size, which is specified beforehand, and whether or not the continuity of the read-out data is maintained.

In a ninth aspect according to the eighth aspect, the data consistency determination module compares third check data, which is created when data of the different specified size is read out from the cache memory, against fourth check data, which is created when the data of the different specified size is sent to the outside, and determines that the data read out from the cache memory and sent has consistency when the third check data matches the fourth check data.

A data consistency determination method according to a tenth aspect is a method for determining the consistency of data transferred to the cache memory when the data transfer to the cache memory can be executed discontinuously, and comprises: a step of transferring received data to the cache memory; a step of creating determination data for the data transferred to the cache memory; a step of storing the created determination data; a step of determining whether or not the data has been transferred to the cache memory in proportion to a specified size, which is specified beforehand; and a step of determining the consistency of the data, which has been transferred to and stored in the cache memory, based on the stored determination data when it is determined that the specified-size data has been transferred to the cache memory.

In an eleventh aspect according to the tenth aspect, the determination data comprises any one of (A) check data for detecting an error in the data stored in the cache memory, (B) a bitmap for managing the presence or absence of data stored in the cache memory in units of a prescribed size, or (C) a log of the address of the data stored in the cache memory, and in the step of determining the consistency of the data, (a) when the determination data is configured as the check data, first check data, which is created when the data is stored in the cache memory, is compared against second check data, which is created when the data is read out from the cache memory, and is it determined that the data stored in the cache memory has consistency when the first check data matches the second check data, (b) when the determination data is configured as a bitmap, it is determined that the data stored in the cache memory has consistency when bits, which show that the data has been stored, are respectively configured in all the bitmaps, and (c) when the determination data is configured as a log, it is determined that the data stored in the cache memory has consistency when a start address and an end address shown in the log match a start address and an end address corresponding to a specified size, which is specified beforehand.

A storage controller according to a twelfth aspect is for controlling the exchange of data between a host computer and a storage device, and comprises: a first communication controller for executing communications with the host computer; a second communication controller for executing communications with the storage device; and a data transfer controller, which is disposed between the first communication controller and the second communication controller, respectively controls data transfers between the cache memory and the first communication controller and second communication controller, and is able to execute a data transfer from the first communication controller to the cache memory discontinuously, and the data transfer controller comprises: a check data creation module for creating check data for detecting a data error in the received data; a check data storage module for temporarily storing the created check data; and a data consistency determination module for determining the consistency of data stored in the cache memory, which determines whether or not the data stored in the cache memory matches a specified size, which is specified beforehand, and whether or not the continuity of the data is maintained.

At least one part of either the respective modules or the respective steps of the present invention may be configured as a computer program. This computer program can be affixed to a recording medium and distributed, or can be delivered by way of a network.

BRIEF DESCRIPTION OF THE DRAWINGS

FIG. 5 is a flowchart of a data transfer process;

FIG. 10 is a block diagram showing the configuration of a data transfer circuit related to a second embodiment;

FIG. 16 is a schematic diagram showing how to switch a log address to be stored in a log buffer in accordance with a write command;

DESCRIPTION OF THE PREFERRED EMBODIMENTS

Figure 1:
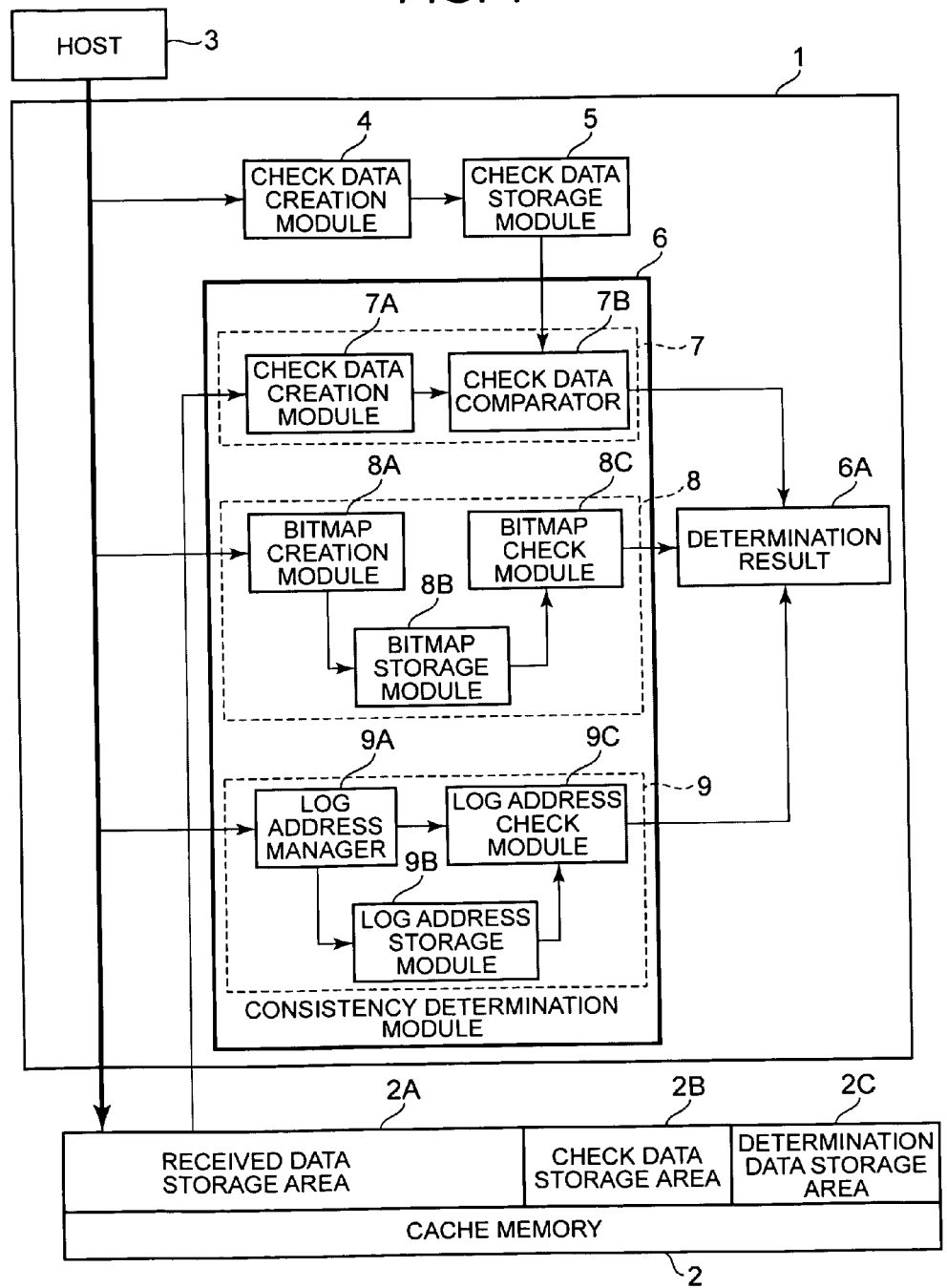
FIG. 1 is a schematic diagram showing an overall concept of an embodiment of the present invention.

The embodiments of the present invention will be explained below based on the figures. First of all, the concept of the present invention will be explained, and thereafter, the specific embodiments will be explained. FIG. 1 is a diagram schematically showing the concept of the present invention. FIG. 1 and the following description related to FIG. 1 show the concept of the present invention to the extent necessary to understand and implement the present invention, but do not limit the scope of the present invention to the scope described in FIG. 1.

FIG. 1 is a schematic diagram showing the concept of an information processing system comprising a data transfer controller according to the present invention. This information processing system, for example, comprises a data transfer controller 1 (hereinafter, will also be called the controller 1); a cache memory 2; and a host 3.

The host 3, which is configured as a server, mainframe or the like, issues data (write-data) to be stored in the cache memory 2. The controller 1 transfers the write-data received from the host 3 to the cache memory 2, and stores this write-data in the cache memory 2.

The cache memory 2 is a memory device for temporarily storing write-data received from the host 3.

Furthermore, as will become clear from the embodiments explained hereinbelow, data read out from a logical volume can also be temporarily stored in the cache memory 2.

The cache memory 2, for example, can comprise a received data storage area 2A; a check data storage area 2B; and a determination data storage area 2C. The received data storage area 2A is the area for storing either data received from the host 3, or data read out from a logical volume. The check data storage area 2B is the area for storing the check data of each logical block. The determination data storage area 2C is the area for storing data for determining the consistency of the data stored in the cache memory 2.

The controller 1 controls a data transfer between the host 3 and the cache memory 2. In addition to functions for transferring and storing data received from the host 3 in the cache memory 2, the controller 1 also comprises a check data creation module 4; a check data storage module 5; and a consistency determination module 6.

Check data is a code configured from a logical address (LA) and LRC, and is for guaranteeing the correctness of data. The check data creation module 4 is a function for respectively creating check data for each logical block. The check data storage module 5 is a function for temporarily storing the created check data.

The consistency determination module 6 is a function for determining the consistency of data stored in the cache memory 2. Consistency, for example, signifies that all data that should be stored in the cache memory 2 has been correctly stored in the cache memory 2.

The consistency determination module 6, as will be described hereinbelow, is able to determine data consistency using any one of a plurality of types of methods 7 through 9. A first determination method 7 is one that uses the check data (guarantee code) as determination data for determining consistency. A second determination method 8 is one that uses a bitmap as the determination data. A third determination method 9 is one that uses an address log of data stored in the cache memory 2 as the determination data.

In the first determination method 7, check data created when data received from the host 3 is stored in the cache memory 2 is compared against check data created when data is read out from the cache memory 2.

When data is received from the host 3, the check data creation module 4 respectively creates check data for each logical block of the received data, and stores these created check data in the check data storage module 5.

When write-data proportional to a size specified by a write command is received, a different check data creation module 7A reads out the data from the cache memory 2, and creates check data anew. A check data comparator 7B compares the check data created when the write-data was received (first check data) against check data created when the write-data was read out from the cache memory 2 (second check data), and determines whether or not the two match.

When the check data at reception time matches the check data at read-out time, this signifies that all of the data received from the host 3 has been correctly stored in the cache memory 2. That is, the transfer was completed normally. By contrast, when the check data at reception time does not match the check data at read-out time, this signifies that the data that should have been stored has not been stored correctly in the cache memory 2. That is, the transfer ended abnormally. The consistency determination module 6 outputs either normal end or abnormal end as a determination result 6A. When abnormal end is outputted, the host 3 resends the write-data.

The second determination method 8 utilizes a bitmap for managing the data received from the host 3 in prescribed size units, and when all the bits of the bitmap have been configured, determines that the data has been correctly stored in the cache memory 2.

A bitmap creation module 8A creates a bitmap corresponding to a size specified from the host 3. The host 3 can use a write command to notify the size of the write-data beforehand. The bitmap creation module 8A updates the bitmap each time data of the prescribed size is received from the host 3. For example, a "1" is configured in the bit corresponding to a received portion of data. The bitmap is stored in a bitmap storage module 8B.

A bitmap check module 8C reads out the bitmap stored in the bitmap storage module 8B, and checks whether or not a value (for example, "1"), which shows that all the bits have been received, has been configured. When all the bits of the bitmap are configured as having been received, this signifies that the data has been correctly stored in the cache memory 2.

In the third determination method 9, a determination is made on the basis of a log address as to whether or not data has been correctly stored in the cache memory 2. A log address manager 9A manages a log address showing the address of data stored in the cache memory 2. A start address and an end address are recorded in the log address. A log address check module 9C reads out a log address from a log address storage module 9B, and determines the consistency of the data stored in the cache memory 2 on the basis of the log address.

This will be explained using a simple example. The host 3 specifies a start address and data size, and issues a write command. Therefore, a value obtained by adding the data size to the start address constitutes the end address. When the write-data is sent discontinuously in fragments, the start address and end address of each data fragment is stored as a log address.

For example, when the end address of a first data fragment matches the start address of a second data fragment, the end address of the first data fragment is updated to the end address of the second data fragment. This is because the first data fragment and the second data fragment are determined to be continuous data. Thus, by checking the addresses of the respective data that is received, one start address and one end address will remain for each log address. In this case, a determination can be made that the data has been correctly stored in the cache memory 2. By contrast, if one part of the data is missing, a plurality of pairs of start addresses and end addresses will exist.

Configuring this embodiment like this makes it possible to determine the consistency of the data stored in the cache memory 2 even when the data is transferred discontinuously to the cache memory 2, thereby enhancing usability.

In this embodiment, any one of a first determination method 7 through a third determination method 9 can be used to determine whether or not data has been correctly stored in the cache memory 2. Therefore, for example, any one of the determination methods can be employed in accordance with the required determination accuracy, usable memory size, and the time needed to carry out a determination.

For example, in the case of the first determination method, there is the likelihood that the first check data and the second check data will haphazardly coincide even when erroneous data has been stored in the cache memory 2. That is, there are limits to LRC-based error detection.

In the case of the second determination method, consistency can be determined more reliably than with the first determination method because a bitmap is used to manage whether or not the data has been transferred to the cache memory 2. However, the size of the buffer will increase due to storing the bitmap. In the case of specifications that enable a plurality of write commands to be processed simultaneously, a bitmap must be prepared and stored for each write command.

In the case of the third determination method, the consistency of the data can be determined more reliably than with the first determination method as a result of managing the addresses of the data stored in the cache memory 2. Further, since a bitmap is not used, the size of the buffer needed for determination is smaller than in the second determination method. However, the number of log address entries must be configured in accordance with the extent of fragmentation of the received data (in accordance with the state of data discontinuity). Configuring a large number of entries runs the risk of using the buffer unnecessarily. This embodiment will be explained in detail hereinbelow.

Embodiment 1

Figure 2:
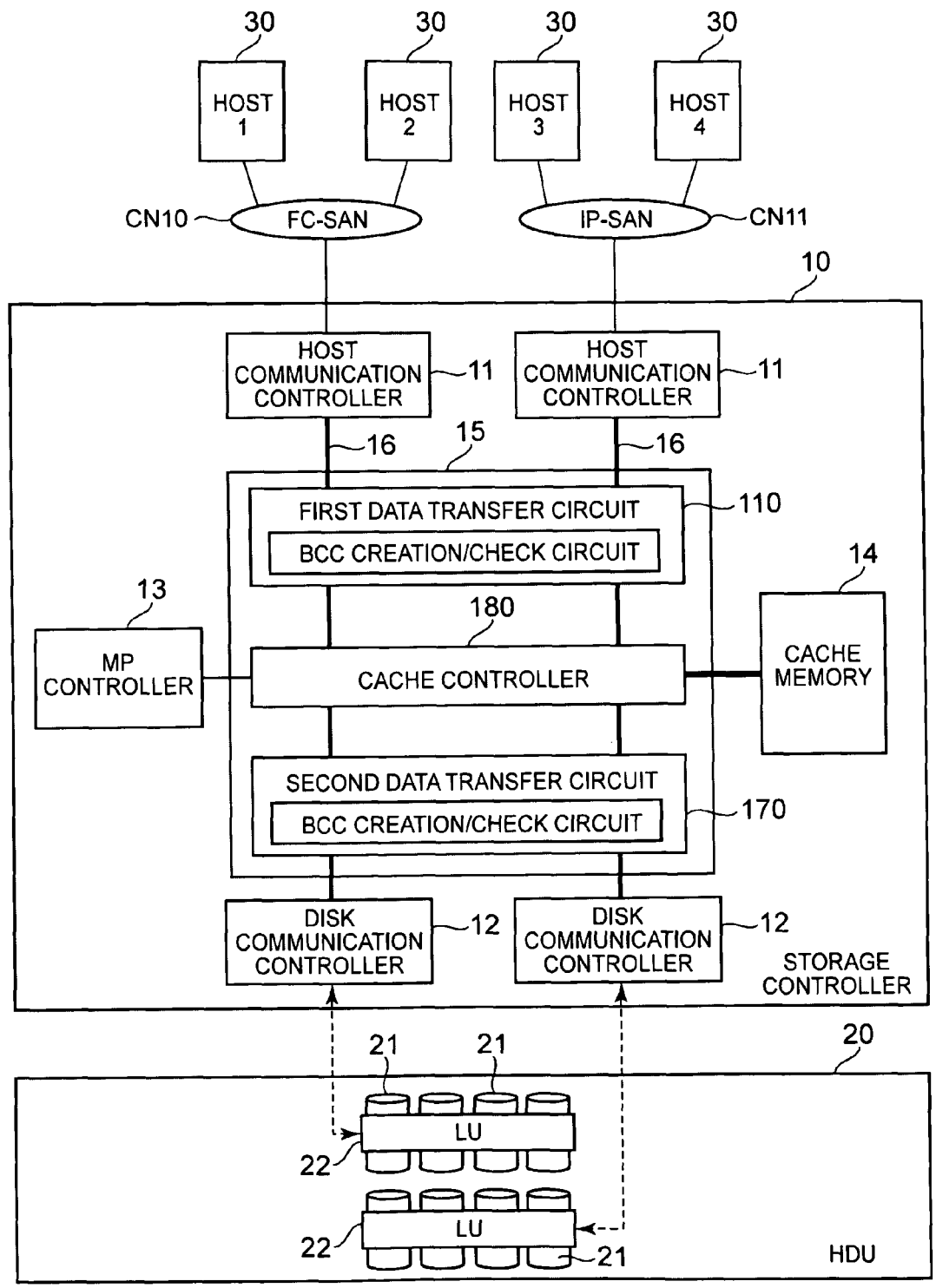
FIG. 2 is a block diagram of an entire information processing system comprising a storage controller.

FIG. 2 is a schematic diagram showing the overall configuration of an information processing system comprising a storage controller 10 related to this embodiment. This information processing system, for example, comprises at least one storage controller 10; at least one storage drive mounting unit 20; and at least one host 30. A data transfer control circuit 15 inside the storage controller 10 corresponds to the data transfer controller 1 of FIG. 1.

Initially, the storage drive mounting unit (hereinafter, HDU) 20 and the host 30 will be explained, and then the configuration of the storage controller 10 will be explained. The storage drive mounting unit 20 comprises a plurality of storage drives 21. The respective storage drives 21, for example, are configured as hard disk devices. The storage drives 21 are not limited to hard disk devices; the configuration can also make use of flash memory devices, magneto-optical storage devices, and holographic memory devices.

A parity group, for example, is configured from a prescribed number of storage drives 21, such as two per group or four per group, differing in accordance with the RAID configuration. A parity group virtualizes the physical storage areas of the respective storage drives 21 inside the parity group as a single storage area. One or more logical volumes 22, which are logical devices, can be disposed in the physical storage areas of the parity group. Furthermore, the configuration can also be such that one or more logical volumes 22 are disposed in the physical storage area of a single storage drive 21.

The host 30, for example, is configured as a server or a mainframe computer, and is connected to the storage controller 10 via communication networks CN10, CN11. The one communication network CN10, for example, is configured like a FC-SAN (Fibre Channel-Storage Area Network). The other communication network CN11, for example, is configured like an IP-SAN (Internet Protocol-Storage Area Network). That is, the storage controller 10 can be mapped to either mainframe hosts (host 1, host 2) or open system hosts (host 3, host 4).

The storage controller 10, for example, comprises a host communication controller 11 as the "first communication controller", a disk communication controller 12 as the "second communication controller", a microprocessor controller 13 (MP controller 13 in the figure), a cache memory 14, a data transfer control circuit 15, and a data communication path 16.

The host communication controller 11 is a circuit for controlling communications with the host 30. The host communication controller 11 will be explained in detail hereinbelow together with FIG. 3. The disk communication controller 12 is a circuit for controlling communications with the respective storage drives 21.

The microprocessor controller 13 is a circuit for respectively controlling the host communication controller 11, disk communication controller 12, and data transfer control circuit 15 in accordance with a command received from the host 30.

The data transfer control circuit 15 is a circuit for controlling control information (a data input/output request) and the transfer of data. The data transfer control circuit 15 controls the transfer of control information between the host communication controller 11 and the microprocessor controller 13, and the transfer of control information between the disk communication controller 12 and the microprocessor controller 13.

Furthermore, the data transfer control circuit 15 also controls the sending and receiving of data between the host communication controller 11 and the cache memory 14, and the sending and receiving of data between the disk communication controller 12 and the cache memory 14. Furthermore, the data communication path 16, for example, is configured as a serial transfer interface like PCI Express.

The data transfer control circuit 15, for example, comprises a first data transfer circuit 110; a second data transfer circuit 170; and a cache controller 180. The first data transfer circuit 110 executes a data transfer between the host communication controller 11 and the cache memory 14. The second data transfer circuit 170 executes a data transfer between the disk communication controller 12 and the cache memory 14. The cache controller 180 controls the data input/output to/from the cache memory 14.

The first data transfer control circuit 110 and the second data transfer control circuit 170 can be provided with functions for creating and checking a Block Check Code (abbreviated as BCC) as check data as will be explained hereinbelow.

For example, when the host communication controller 11 receives a write command from the host 30, the host communication controller 11 transfers the write command to the microprocessor controller 13 by way of the data transfer control circuit 15.

The microprocessor controller 13 configures a transfer parameter in the first data transfer control circuit 110 in accordance with the received write command, and issues an indication to the host communication controller 11 to start the data transfer. Consequently, the data is transferred from the host communication controller 11 to the cache memory 14 via the data transfer control circuit 15, and stored in the cache memory 14. The host communication controller 11 notifies the microprocessor controller 13 to the extent that the data has been stored in the cache memory 14.

The microprocessor controller 13 configures a transfer parameter in the second data transfer circuit 170, and issues an indication to the disk communication controller 12 to transfer the data to the logical volume 22. Consequently, the data, which had been read out from the cache memory 14, is written via the disk communication controller 12 to the storage drive 21 that configures the logical volume 22.

When the host communication controller 11 receives a read command from the host 30, the host communication controller 11 checks whether or not the read-targeted data is in the cache memory 14. When the data to be read out is not in the cache memory 14, the microprocessor controller 13 configures a transfer parameter in the second data transfer circuit 170, and issues an indication to the disk communication controller 12 to start data transfer. The disk communication controller 12 reads out the read-targeted data from the logical volume 22, and stores this data in the cache memory 14.

The microprocessor controller 13 configures a transfer parameter in the first data transfer circuit 110, and issues an indication to the host communication controller 11 to start data transfer. The host communication controller 11 reads out the data stored in the cache memory 14, and sends this data to the host 30.

Figure 3:
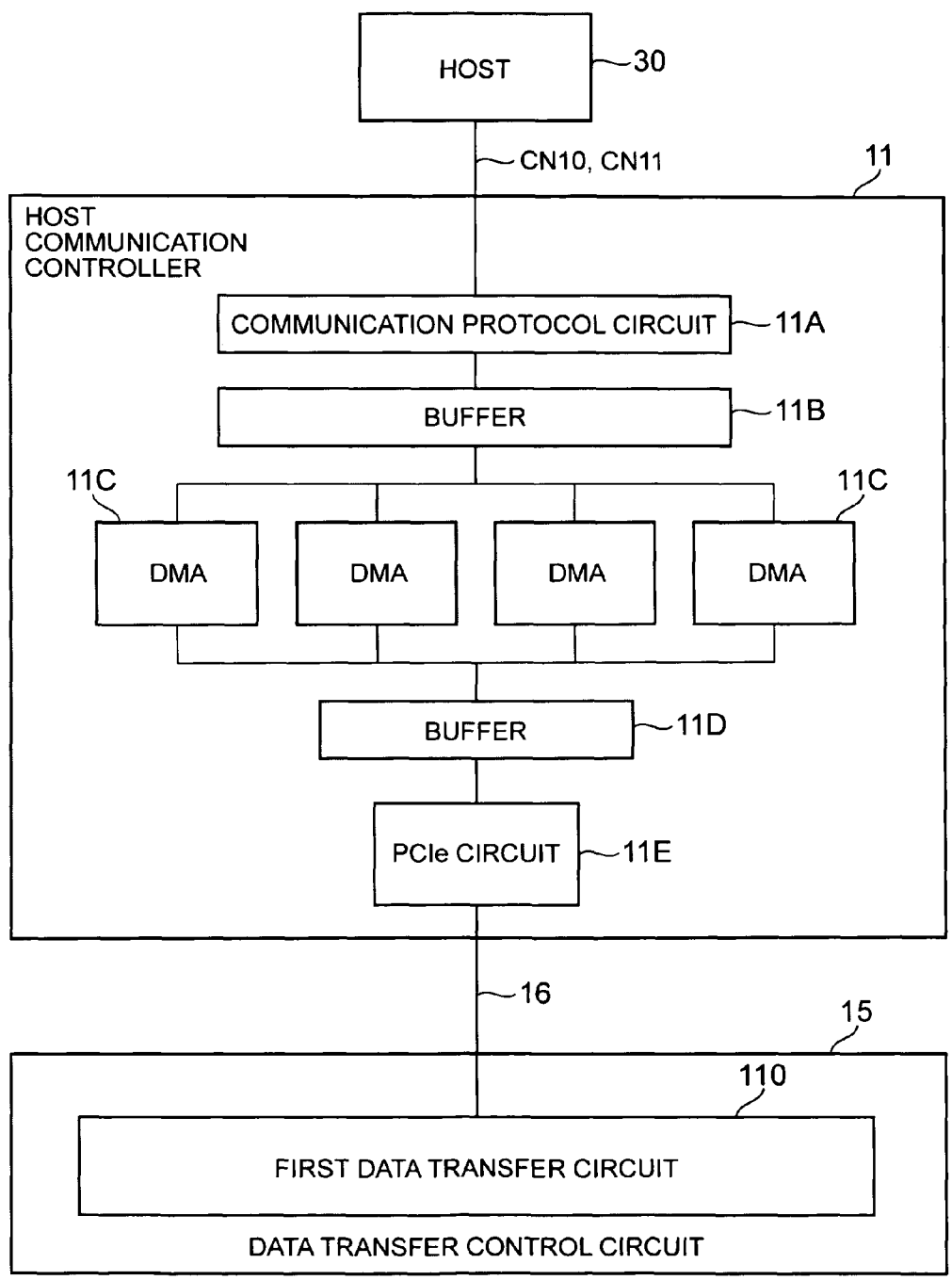
FIG. 3 is a block diagram showing a simplified configuration of a host communication controller.

FIG. 3 is a block diagram schematically showing the configuration of the host communication controller 11. The host communication controller 11, for example, comprises a communication protocol circuit 11A; a receive buffer 11B; a plurality of DMA (Direct Memory Access) circuits 11C; a send buffer 11D; and a PCI Express communication interface circuit 11E.

That is, the host communication controller 11 uses the plurality of DMA circuits 11C to send write-data received from the host 30 to the data transfer control circuit 15. The respective DMA circuits 11C operate in parallel.

Therefore, even if the host communication controller 11 receives continuous write-data from the host 30, there is the likelihood of discontinuous data being sent from the host communication controller 11 to the first data transfer circuit 110. That is, data may be transferred in a transposed order from the host communication controller 11 to the first data transfer circuit 110. A data order that is discontinuous rather than continuous is called out-of-order.

Figure 4:
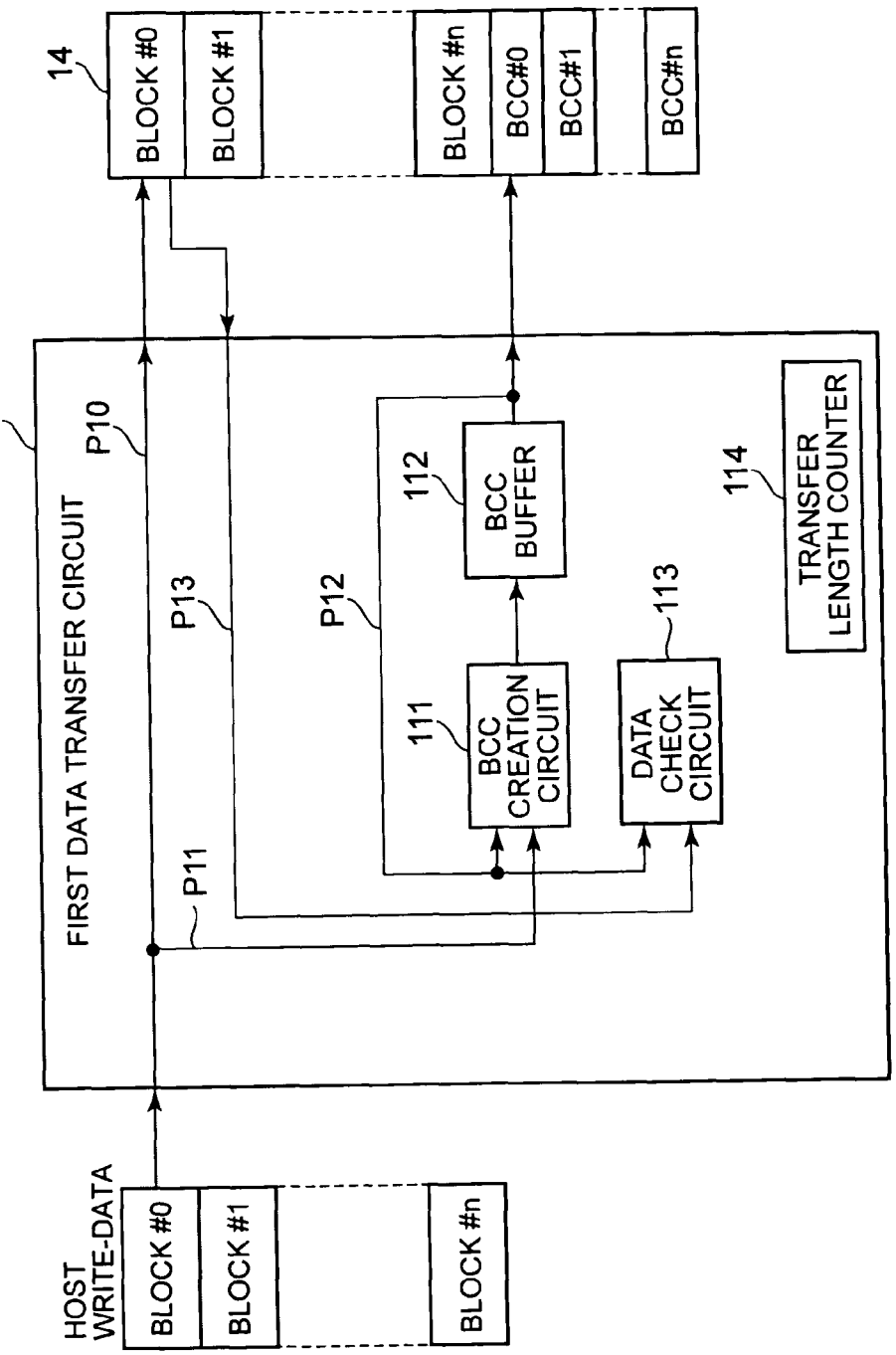
FIG. 4 is a block diagram showing a simplified configuration of a data transfer circuit.

FIG. 4 is a block diagram schematically showing the configuration of the first data transfer circuit 110. The first data transfer circuit 110, for example, comprises a BCC creation circuit 111 for creating a BCC (Block Check Code); a BCC buffer 112 for storing a BCC; a data check circuit 113; and a transfer length counter 114.

The data check circuit 113 comprises a function for creating a BCC based on respective logical block data read in from the cache memory 14; and a function for comparing this created BCC against a BCC read out from the BCC buffer 112.

The transfer length counter 114 is a circuit for detecting the size of data being transferred via the first data transfer circuit 110. The transfer length counter 114 can determine whether or not the size of data being transferred via the first data transfer circuit 110 reaches the size (transfer length) specified from the host 30.

The left side of FIG. 4 shows write-data that has been received from the host 30. This write-data is configured from a plurality of logical blocks. The size of the respective logical blocks, for example, is 512 bytes.

The write-data is inputted from the host communication controller 11 to the first data transfer circuit 110 via the data communication path 16. The write-data is transferred via path P10 to the cache memory 14, and stored in the cache memory 14.

The write-data inputted to the first data transfer circuit 110 is also inputted to the BCC creation circuit 111 via path P11. The BCC creation circuit 111 creates a BCC for each logical block of the inputted write-data. The created BCC are stored the BCC buffer 112.

The BCC buffer 112 is a size capable of supporting the maximum number of blocks transferable for a single write command. The BCC comprises the LRC described hereinabove (a horizontal parity). Therefore, in order to create a complete BCC for one logical block, this entire logical block must be inputted to the BCC creation circuit 111. The BCC buffer 112 is capable of storing for each logical block an intermediate result for calculating a BCC.

When only half of a certain logical block is inputted to the BCC creation circuit 111, the BCC creation circuit 111 carries out a BCC operation on the basis of this half of the logical block. The BCC operation intermediate result outputted from the BCC creation circuit 111 is stored in the BCC buffer 112.

When the remaining half of the logical block is inputted to the BCC creation circuit 111, the BCC creation circuit 111 acquires the value of the previously calculated intermediate result from the BCC buffer 112 by way of path P12, and calculates a complete BCC using this intermediate result value. The complete BCC is stored in the BCC buffer 112, as well as in the cache memory 14.

Thus, the BCC buffer 112 is used for calculating a BCC and for storing a BCC that has been calculated. The BCC buffer 112 can be eliminated, and a work area for temporarily storing BCC can be provided inside the cache memory 14.

However, when a work area is provided in the cache memory 14 in place of the BCC buffer 112, cache memory 14 access frequency is likely to increase, thereby adversely affecting data transfer performance. Accordingly, in this embodiment, a BCC buffer 112 is disposed inside the first data transfer circuit 110. Consequently, cache access for BCC operations can be eliminated, and data transfer performance can be improved.

When write-data of the size specified by the write command is received, the data check circuit 113 reads out the write-data (block #0 through #n) from the cache memory 14, and calculates a BCC for each logical block.

The data check circuit 113 compares the BCC calculated anew against the BCC stored in the BCC buffer 112. When the two BCC match, a determination can be made that all the data inputted from the host 30 has been written to the cache memory 14.

FIG. 5 is a flowchart showing a simplified data transfer process. Furthermore, the respective flowcharts shown hereinbelow show overviews of the respective processes to the extent required to understand and implement the present invention, and these processes may differ from those of actual computer programs. A person having ordinary skill in the art should be able to change a step shown in the figures, add a new step, and delete an existing step.

The first data transfer circuit 110 (hereinafter, will also be called the transfer circuit 110) sets a transfer parameter and initializes the BCC buffer 112 (S10). That is, at the start of a transfer, the transfer circuit 110 initializes the BCC buffer area in accordance with the number of blocks (size of the write-data) specified by the write command (S10).

For example, when attempting to transfer three logical blocks to the cache memory 14, the transfer circuit 110 will initialize a BCC buffer area to hold three BCC. This is done so as to store the BCC related to the respective logical blocks.

Then, the transfer circuit 110 waits for the data to be inputted from the host communication controller 11 (S11). When the write-data from the host communication controller 11 arrives (S11: YES), the transfer circuit 110 calculates the corresponding logical block number based on the address of this write-data (S12). The transfer circuit 110 reads out from the BCC buffer 112 the BCC corresponding to the calculated block number (S12).

The transfer circuit 110 computes the BCC for the data inputted in S11, and writes the result of this computation to a prescribed area inside the BCC buffer 112 (S13). In other words, since the BCC comprises an LRC, the transfer circuit 110 (more accurately, the BCC creation circuit 111) cannot obtain a complete BCC until all the data of a single logical block has been received. Accordingly, the transfer circuit 110 computes a BCC by reading in the computational intermediate results accumulated in the BCC buffer 112 (S13). Furthermore, the transfer circuit 110 transfers the write-data received in S11 to the cache memory 14 and stores this data therein (S13).

The transfer circuit 110 updates the value of the transfer length counter 114 by the size of the data received in S11 (S14). The transfer circuit 110 determines whether or not the value of the transfer length counter 114 matches the transfer length specified in the write command (S15). The transfer circuit 110 repeats S11 through S14 until data of the specified size has been received (S15). For example, when a size of three logical blocks is specified as the specified transfer length, the transfer circuit 110 transfers the data to the cache memory 14 while computing the BCC of the respective logical blocks until the three logical blocks worth of data have been completely transferred to the cache memory 14.

When write-data of the specified size has been transferred to the cache memory 14 (S15: YES), the transfer circuit 110 transfers the BCC stored in the BCC buffer 112 from the BCC buffer 112 to the cache memory 14, and stores these BCC in a prescribed location inside the cache memory 14 (S16). As shown in the right side of FIG. 4, the data of the respective logical blocks and the BCC calculated from the respective logical block data are respectively stored in the cache memory 14.

Next, the transfer circuit 110 uses the data check circuit 113 to determine whether or not the data stored in the cache memory 14 has consistency. First, the transfer circuit 110 reads out the data of one logical block from the cache memory 14 (S17), and once again calculates the BCC for this read-out data (S18).

The data check circuit 113 of the transfer circuit 110 determines whether or not the BCC calculated in S18 matches the BCC stored in the BCC buffer 112 (S19) The transfer circuit 110 repeats S17 through S19 until data of the specified size has been read out (in the example described hereinabove, until three logical blocks worth of data have been read out) (S20).

In other words, the transfer circuit 110 respectively compares the BCC that have already been created (the BCC stored in the BCC buffer 112) against the BCC that has been calculated anew for each logical block of all the write-data stored in the cache memory 14.

When the BCC created with the write-data was stored in the cache memory 14 (the BCC stored in the BCC buffer 112) and the BCC created when this data was read out from the cache memory 14 match (S19: YES), this logical block data can be determined to have been correctly stored in the cache memory 14.

By contrast, when the BCC stored in the BCC buffer 112 and the BCC calculated when the data was read out from the cache memory 14 do not match (S19: NO), it can be determined that some sort of abnormality has occurred in the data stored in the cache memory 14. Accordingly, in this case (S19: NO), the transfer circuit 110 ends the data transfer process abnormally. A message to the extent that processing has ended abnormally is notified to the host 30 by way of the host communication controller 11. The host 30 that receives this notification reissues the write command in an attempt to write the data.

When a BCC check proportional to the specified size is carried out (S20: YES), the transfer circuit 110 determines whether or not a circuit abnormality was detected (S21). When a circuit abnormality is not detected (S21: NO), the transfer circuit 110 ends the data transfer process normally. When a circuit abnormality is detected (S21: YES), the transfer circuit 110 ends the data transfer process abnormally.

A circuit abnormality will be explained. This embodiment monitors whether or not an abnormality has occurred by checking the BCC each time data is moved. Therefore, for example, when data is moved in S12 or S13, the transfer circuit 110 checks the value of the BCC and determines whether or not an abnormality has occurred. When an abnormality is detected, the transfer circuit 110 sets a flag showing that a circuit abnormality has occurred. Then, the transfer circuit 110 determines whether or not a circuit abnormality has been detected by checking if a flag showing the occurrence of a circuit abnormality has been set in S21. Furthermore, the configuration can also be such that, instead of the above explanation, the data transfer process is ended abnormally at the point in time when a circuit abnormality is detected during a data move.

A method of storing data in the cache memory 14 and a method for checking the consistency of data stored in the cache memory 14 will be explained on the basis of FIGS. 6 through 9. In the following explanation, a situation in which the data of a total of three logical blocks from block #0 through block #2 is stored in the cache memory 14 will be explained. Therefore, three areas will be provided in the BCC buffer 112 for respectively storing three BCC. A storage area for storing the three logical blocks worth of data will be secured in the cache memory 14.

Furthermore, to facilitate the explanation, it will be supposed that the respective logical blocks are transferred in units of one-half each. For example, the logical block of block #0 is split and transferred as two pieces of data, #0a and #0b. The logical block of block #1 is split and transferred as two pieces of data, #1a and #1b. Similarly, the logical block of block #2 is split and transferred as two pieces of data, #2a and #2b.

Figure 6A:
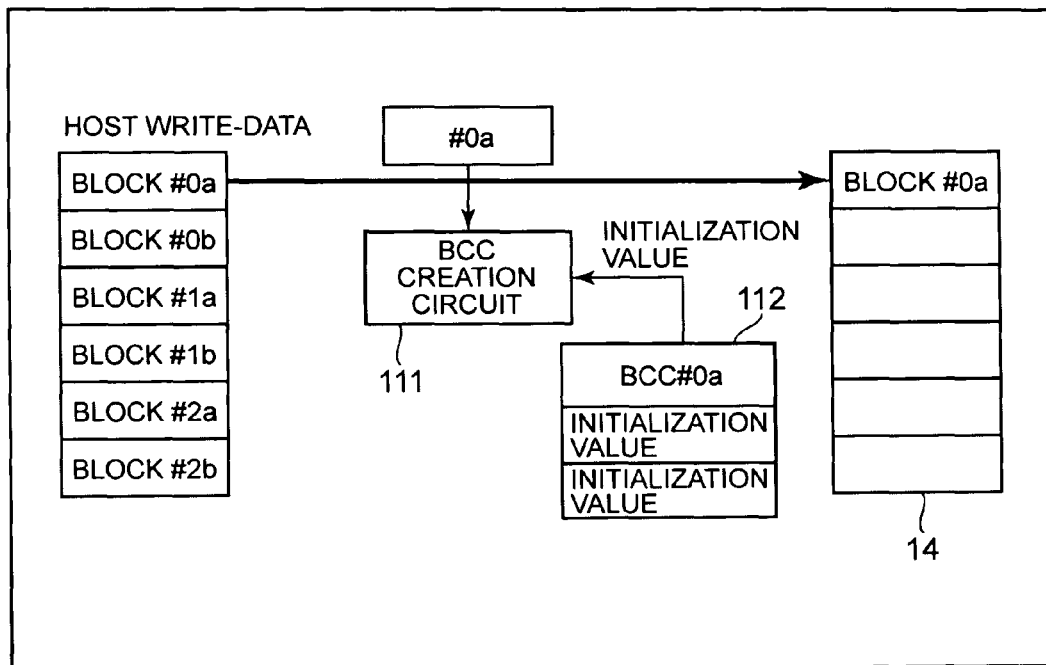
FIG. 6 is a schematic diagram showing how write-data is stored in a cache memory.

As shown in FIG. 6A, when the initial data #0a is inputted to the transfer circuit 110, this initial data #0a is stored in a prescribed location of the cache memory 14. The BCC creation circuit 111 calculates the BCC (LRC) based on the data (#0a), and stores this calculation result (BCC #0a) in a prescribed area of the BCC buffer 112. The respective initial values are stored in other areas inside the BCC buffer 112. BCC #0a, which is stored in the BCC buffer 112, is the intermediate result of a BCC computation related to data #0a, and is not a complete BCC value.

Figure 6B:
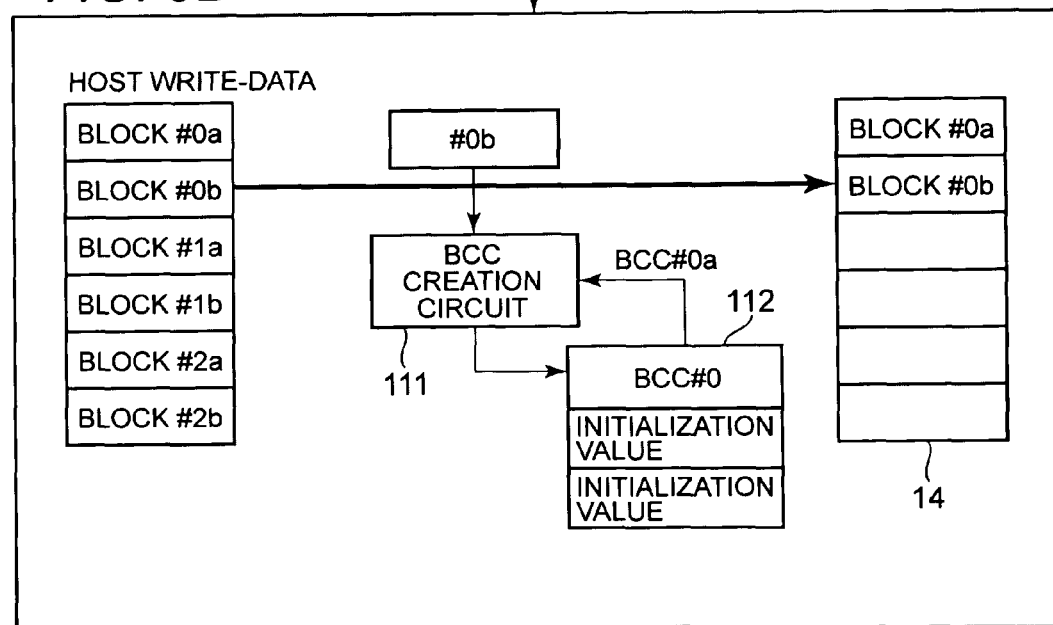

As shown in FIG. 6B, the complete BCC related to the initial logical block #0 is created when both the anterior half of the data #0a and the posterior half of the data #0b have been inputted. When the posterior half of the data #0b of the initial logical block #0 is inputted to the transfer circuit 110, the BCC creation circuit 111 creates BCC #0 related to logical block #0 on the basis of the intermediate result BCC #0a stored in the BCC buffer 112 and data #0b. The created BCC #0 is stored in the BCC buffer 112. Furthermore, the inputted data #0b is stored in the cache memory 14.

Figure 7A:
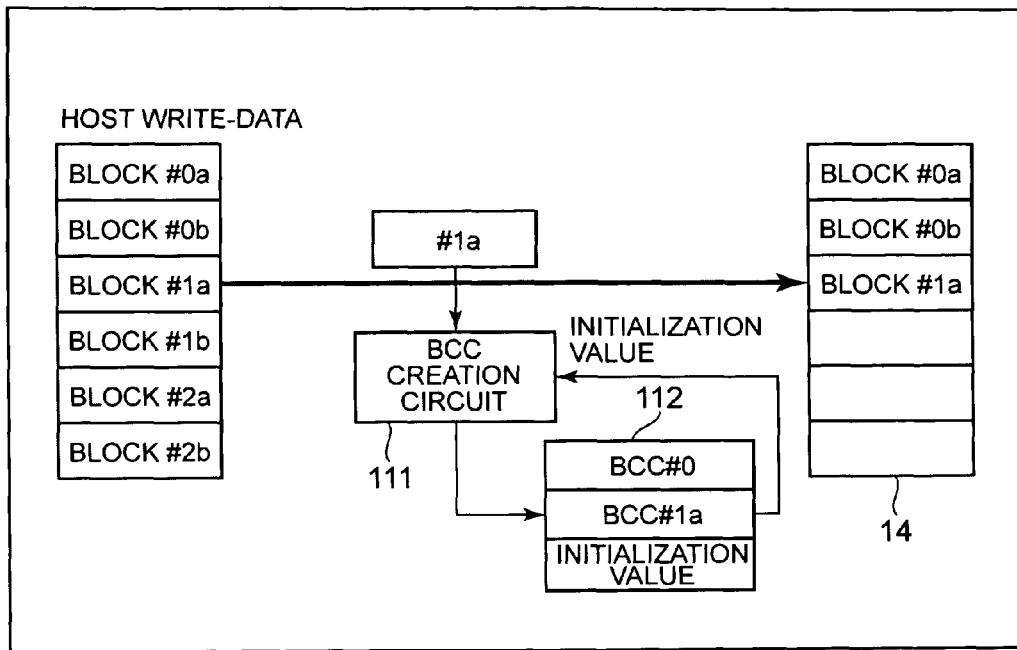
FIG. 7 is a continuation of FIG. 6.

FIG. 7A shows a situation in which the anterior half of the data #1a of the subsequent logical block #1 is inputted to the transfer circuit 110. The data #1a is stored in a prescribed location of the cache memory 14. The BCC creation circuit 111 calculates the intermediate result BCC #1a of the BCC on the basis of the initial value and the data #1a. This intermediate result BCC #1a is stored in a prescribed area of BCC buffer 112.

Figure 7B:
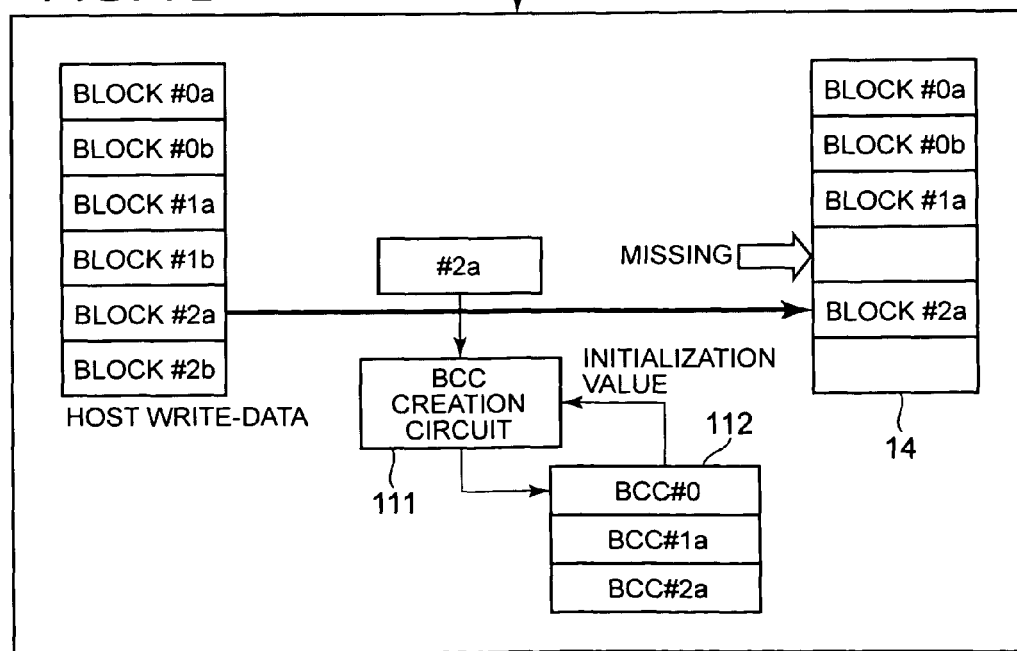

FIG. 7B shows how an out-of-order state related to the reception of data occurs. A situation in which the anterior half of the data #2a of logical block #2 is received first prior to receiving the posterior half of the data #1b of logical block #1 is shown.

By rights, the data should be inputted in the order of #0a→#0b→#1a→#1b→#2a, but the reception sequence of #1b and #2a are transposed, causing an out-of-order state.

In this case, since the posterior half of the data #1b has not arrived, a complete BCC cannot be created for the second logical block #1. Therefore, the intermediate result BCC #1a is stored in the BCC buffer 112. Similarly, the intermediate result BCC #2a for the third logical block #2 is also stored in the BCC buffer 112.

Figure 8A:
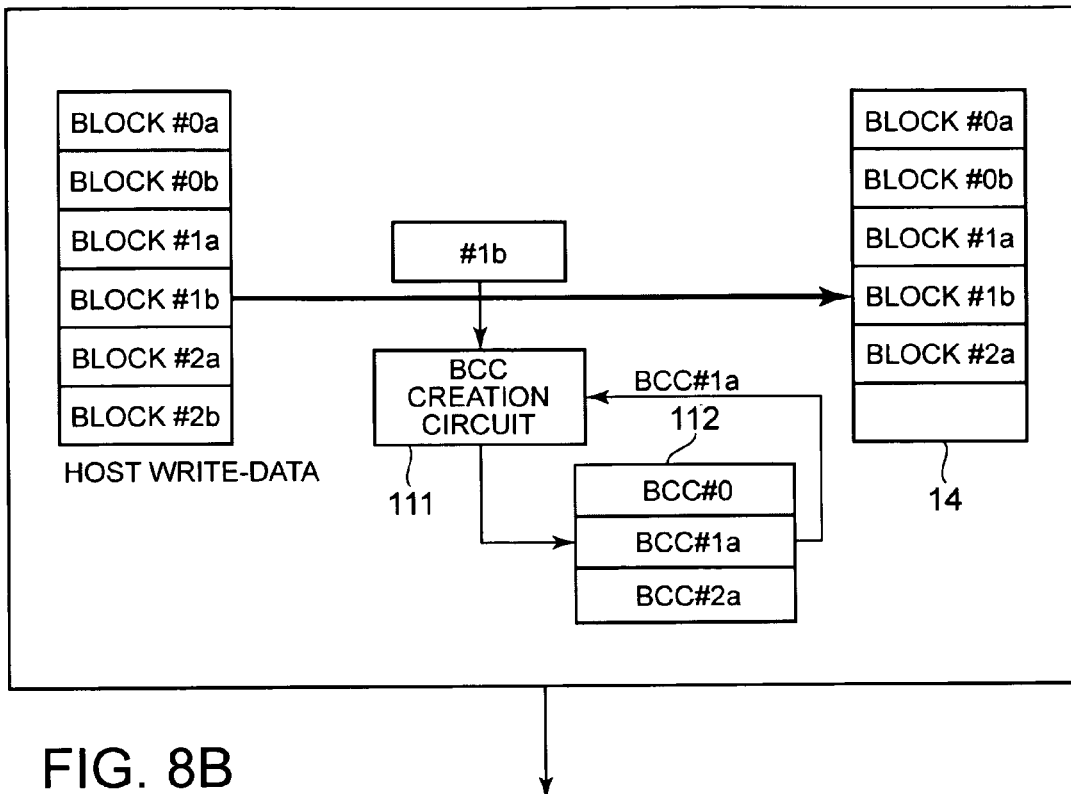
FIG. 8 is a continuation of FIG. 7.

FIG. 8A shows how the posterior half of the data #1b of logical block #1 is received. Thus, since all the data of logical block #1 is present, the BCC creation circuit 111 can calculate a complete BCC for logical block #1. The calculated BCC #1 is stored in the BCC buffer 112.

Figure 8B:
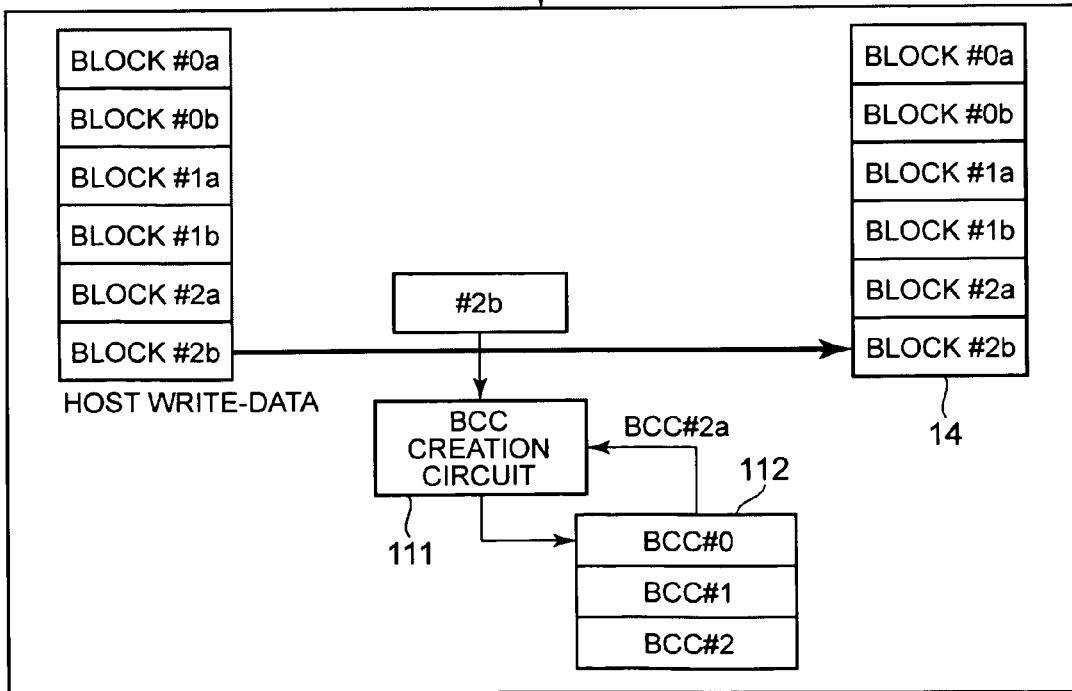

FIG. 8B shows how the posterior half of the data #2b of logical block #2 is received. That is, a situation in which the transfer circuit 110 receives all the data is shown. The BCC creation circuit 111 can create a complete BCC for logical block #2. The created BCC #2 is stored in the BCC buffer 112.

Figure 9A:
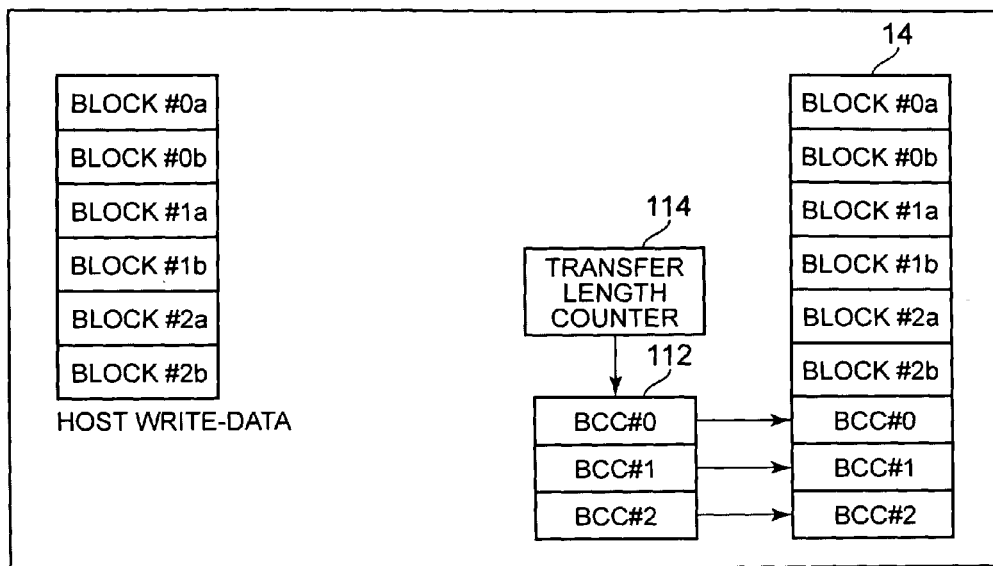
FIG. 9 is a continuation of FIG. 8.

FIG. 9A shows how the BCC (#0 through #2) of the respective logical blocks, which are stored in the BCC buffer 112, are transferred to and stored in the cache memory 14.

Figure 9B:
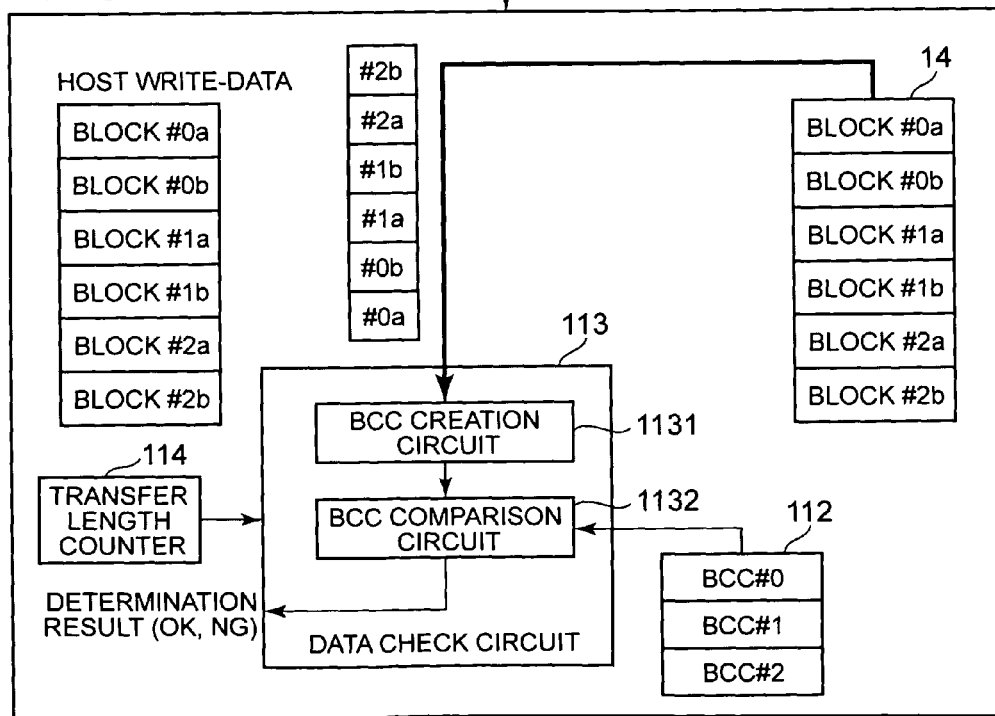

FIG. 9B shows how the data check circuit 113 checks the consistency of data stored in the cache memory 14. This process corresponds to S17 through S21 of FIG. 5. The data check circuit 113, for example, comprises a BCC creation circuit 1131 and a BCC comparator 1132.

The BCC creation circuit 1131 reads in the data of the respective check-targeted logical blocks to the cache memory 14, and calculates a BCC for each logical block. The BCC calculated anew by the BCC creation circuit 1131 corresponds to the "second check data".

Next, the BCC comparator 1132 compares the BCC created by the BCC creation circuit 1131 against the BCC stored in the BCC buffer 112, and determines whether or not the two match. The BCC comparator 1132 respectively compares the BCC created at storage time and the BCC created at read-out time for all logical blocks of the specified size. When two BCC match, a determination that data transfer ended normally can be made provided that no other circuit abnormalities occurred.

Configuring this embodiment like this makes it possible to determine whether or not the data stored in the cache memory 14 has consistency even when an out-of-order state occurs during the transfer of data to the cache memory 14, thereby enhancing usability.

Embodiment 2

A second embodiment of the present invention will be explained on the basis of FIGS. 10 through 14. The following embodiments, to include this embodiment, correspond to variations of the first embodiment. This embodiment manages whether or not write-data has been written to the cache memory 14 using a bitmap (BMP in the figure).

A first data transfer circuit 110A, for example, comprises a BCC creation circuit 111; BCC buffer 112; transfer length counter 114; bitmap control circuit 120; bitmap buffer 121; and bitmap monitoring circuit 122.

Write-data from the host 30 is transferred to the cache memory 14 via path P10, and stored therein. Further, the write-data from the host 30 is inputted to the BCC creation circuit 111 and the bitmap control circuit 120 via a path P11a. The bitmap control circuit 120 can read out a bitmap stored in the bitmap buffer 121 via a path P14.

The BCC creation circuit 111, BCC buffer 112 and transfer length counter 114 realize the same functions as in the first embodiment. That is, the BCC creation circuit 111 calculates a BCC for data check for each logical block. The calculated BCC is stored in the BCC buffer 112. When data of the size specified by a write command is received, the respective BCC stored in the BCC buffer 112 are transferred to and stored in the cache memory 14.

The bitmap control circuit 120 prepares a bitmap for the write-data stored in the cache memory 14. The bitmap manages whether or not write-data has been received in units of a prescribed size. The bitmap is prepared for each logical block of the write-data. The bitmap will be explained hereinbelow in detail together with FIG. 11.

The bitmap buffer 121 stores bitmaps respectively corresponding to the logical blocks configuring the write-data. Similar to the first embodiment, the transfer circuit 110A can respectively process a plurality of write processes in parallel. That is, the transfer circuit 110A can process a plurality of write commands at practically the same time.

Therefore, bitmaps must be prepared in accordance with the number of write commands capable of being processed simultaneously. For example, if it is supposed that the data size specified by a write command is eight blocks, and that the number of write commands capable of being processed simultaneously is four, a total of 32 (=4×8) bitmaps are prepared.

Therefore, the size of the bitmap buffer 121 can be configured to a value for storing 32 bitmaps. However, in this case, the size of the bitmap buffer 121 increases.

Accordingly, in this embodiment, a bitmap storage area is prepared in the cache memory 14 as well, and a bitmap is read out from the cache memory 14 in accordance with the write command and stored in the bitmap buffer 121.

In other words, if this is explained using the example given above, eight bitmaps each are prepared beforehand for every four write commands. If eight bitmaps are treated as a single bitmap group, then four bitmap groups are prepared. These four bitmap groups are respectively stored in the cache memory 14.

The bitmap of the bitmap group that corresponds to the write-data currently undergoing transfer processing from among the four bitmap groups is set in the bitmap buffer 121. A block number is calculated from the address information comprised in the data currently undergoing transfer processing, and the bitmap group corresponding to the calculated block number is specified. Then, the respective bitmaps belonging to the specified bitmap group are read out from the cache memory 14, and stored in the bitmap buffer 121.

The bitmap monitoring circuit 122 specifies the bitmap group corresponding to the write-data currently undergoing transfer processing, and switches to the bitmap that should be stored in the bitmap buffer 121.

Figure 11:
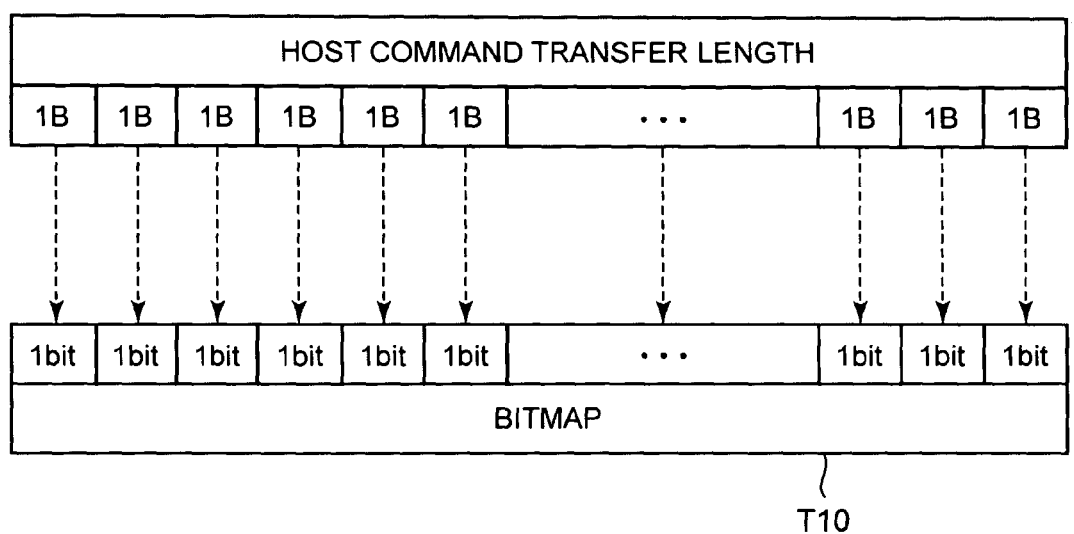
FIG. 11 is a schematic diagram showing the configuration of a bitmap.

FIG. 11 is a schematic diagram showing an example of a bitmap T10. In this embodiment, a bitmap T10 is prepared for each logical block configuring write-data. The size of the logical block, for example, is 512 bytes. The bitmap T10 manages whether or not data has been received for each byte of the logical block.

Therefore, when the block size is 512 bytes, the size of the bitmap T10 constitutes 512 bits. A "1" is configured in the bit corresponding to data inputted to the transfer circuit 110A from among the respective bits of the bitmap T10. When all the bits of the bitmap T10 have been configured to 1, this signifies that all the data of the logical block being managed by this bitmap T10 has been received.

Figure 12:
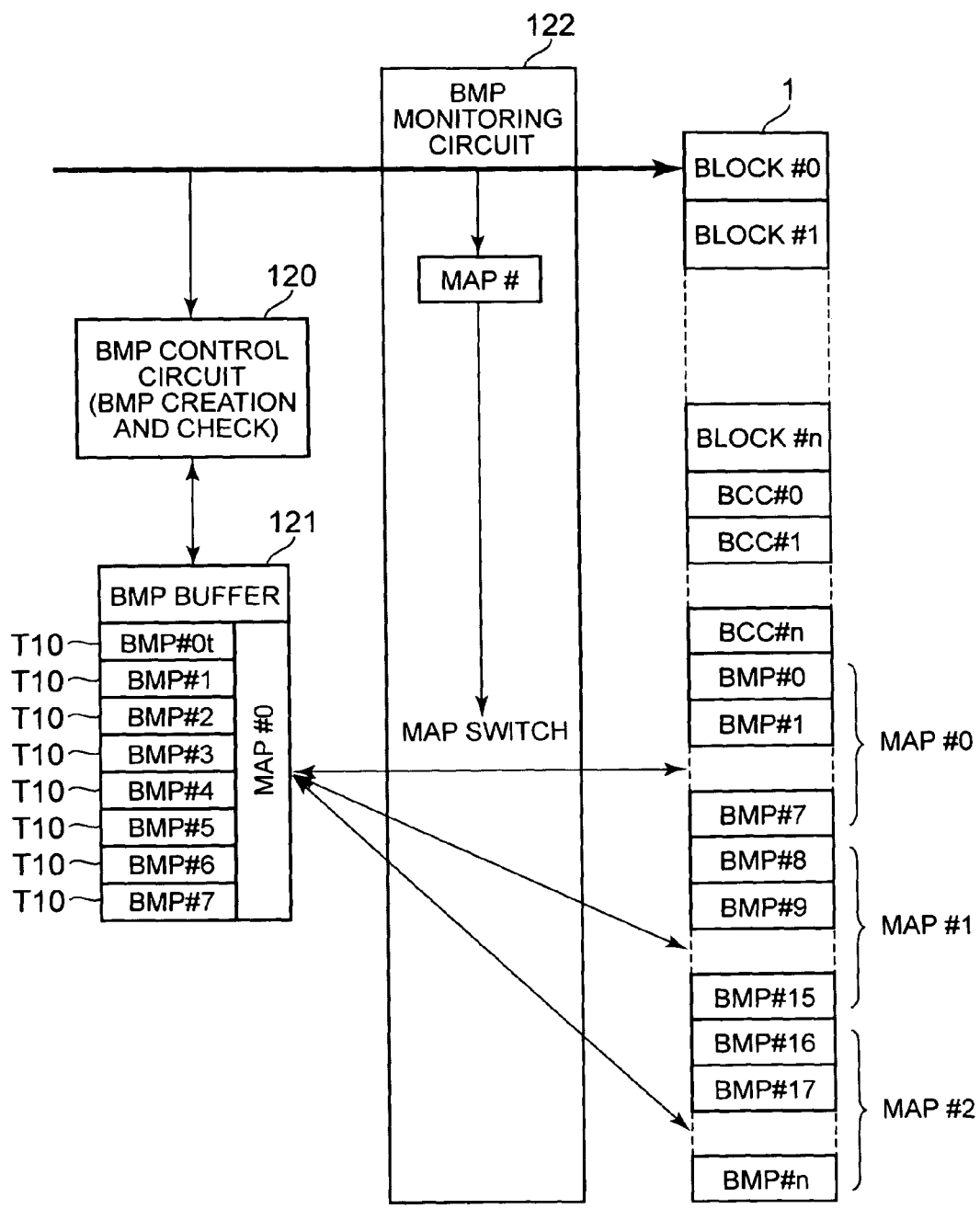
FIG. 12 is a schematic diagram showing how to switch a bitmap to be stored in a bitmap buffer in accordance with a write command.

FIG. 12 is a diagram schematically showing the switching of a bitmap. As described hereinabove, a bitmap is stored in the cache memory 14 for each logical block corresponding to the respective write commands. In FIG. 12, the bitmap groups described hereinabove are partitioned into map numbers. A map number is made correspondent to each write command.

The bitmap monitoring circuit 122 detects a block number from the write-data inputted to the transfer circuit 110A, and specifies the map number corresponding to the detected block number. The bitmap corresponding to the specified map number is read out from the cache memory 14, and stored in the bitmap buffer 121. The bitmap previously stored in the bitmap buffer 121 is transferred to and stored in the cache memory 14.

The bitmap control circuit 120 updates the bitmap stored in the bitmap buffer 121 on the basis of the write-data inputted to the transfer circuit 110A. In other words, the bitmap control circuit 120 configures a "1" in the bit corresponding to the received data.

When data of a pre-specified size is inputted to the transfer circuit 110A, the bitmap control circuit 120 checks whether or not a "1" has been configured in all the bits of the respective bitmaps.

When all the bits inside a bitmap have been configured to "1", all the data of the logical blocks corresponding to this bitmap has been received and stored in the cache memory 14. When a bitmap has a "0" bit, the data corresponding to this bit has not been received, and is not stored in the cache memory 14.

A data transfer process in accordance with this embodiment will be explained on the basis of FIG. 13. The transfer circuit 110A initializes the bitmap buffer 121 (S30). When write-data from the host communication controller 11 arrives (S31: YES), the bitmap monitoring circuit 122 of the transfer circuit 110A detects a block number based on the write-data start address and transfer size, and specifies the map number corresponding to this detected block number (S32).

Next, the bitmap monitoring circuit 122 determines whether or not the block number of the data received in S31 corresponds to the map number configured in the bitmap buffer 121 (S33).

When the block number of the received data does not correspond to the map number of the bitmaps configured in the bitmap buffer 121 (S33: NO), the bitmap monitoring circuit 122 saves the respective bitmaps stored in the bitmap buffer 121 to the cache memory 14 (S34). The bitmap monitoring circuit 122, based on the map number corresponding to the block number of the data received in S31, transfers the respective bitmaps belonging to this map number to the bitmap buffer 121, and stores these bitmaps therein (S35).

The bitmap control circuit 120 updates prescribe bits inside the bitmap corresponding to the data received in S31 from among the respective bitmaps configured in the bitmap buffer 121 (S36). Prescribed bits signify the respective bits corresponding to the data received in S31.

Furthermore, when the block number of the received data corresponds to the map number of the bitmaps configured in the bitmap buffer 121 (S33: YES), S34 and S35 are skipped, and processing moves to S36.

S31 through S36 are executed repeatedly until the count value of the transfer length counter 114 matches the size specified in the write command. Subsequent to updating the bitmap of the specified size data (S37: YES), the bitmap control circuit 120 transfers the respective bitmaps stored in the bitmap buffer 121 to the cache memory 14, and stores these bitmaps in the cache memory 14 (S38). Then, the bitmap control circuit 120 checks the consistency of the data based on the bitmaps (S39).

Figure 13:
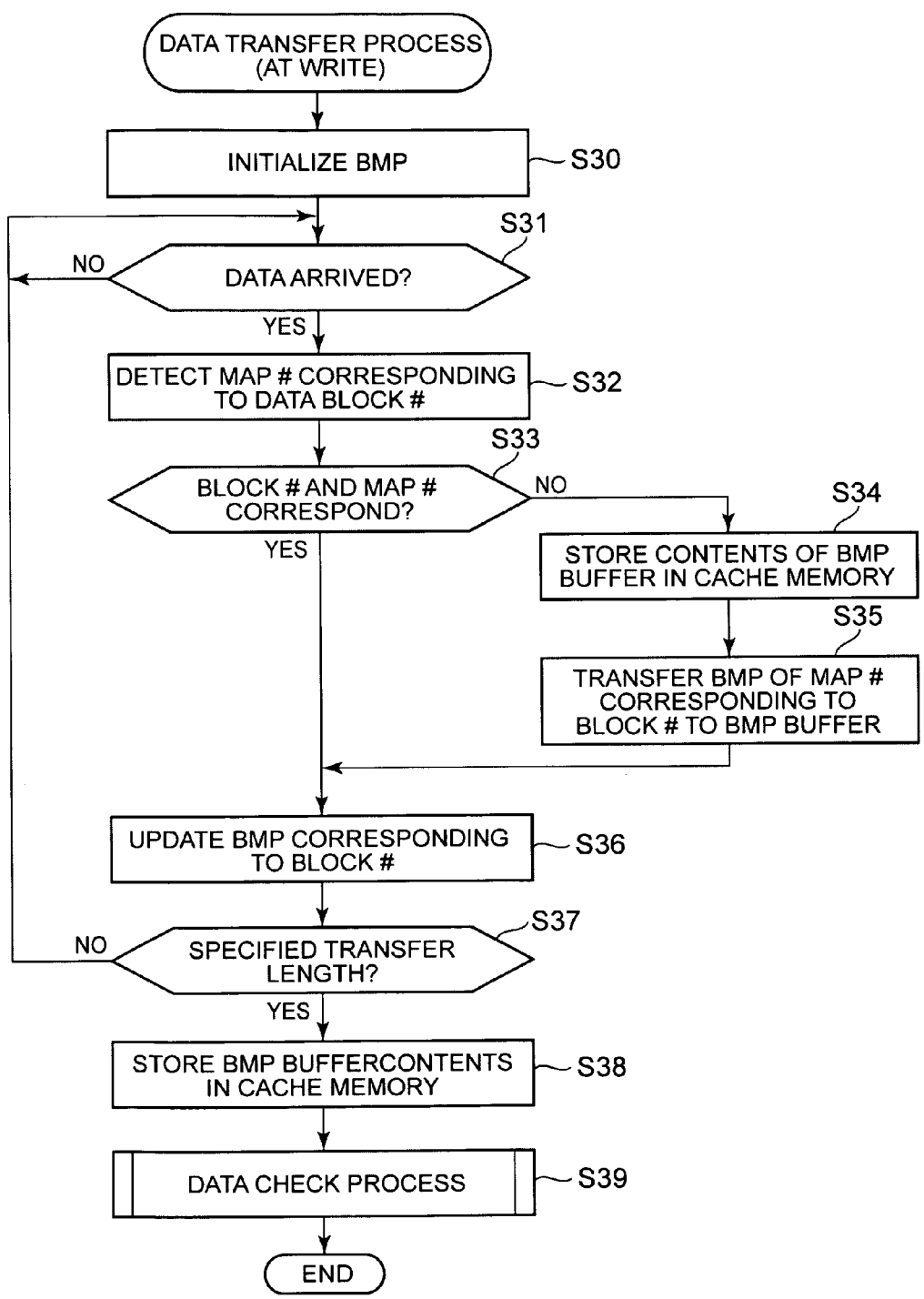
FIG. 13 is a flowchart of a data transfer process.
Figure 14:
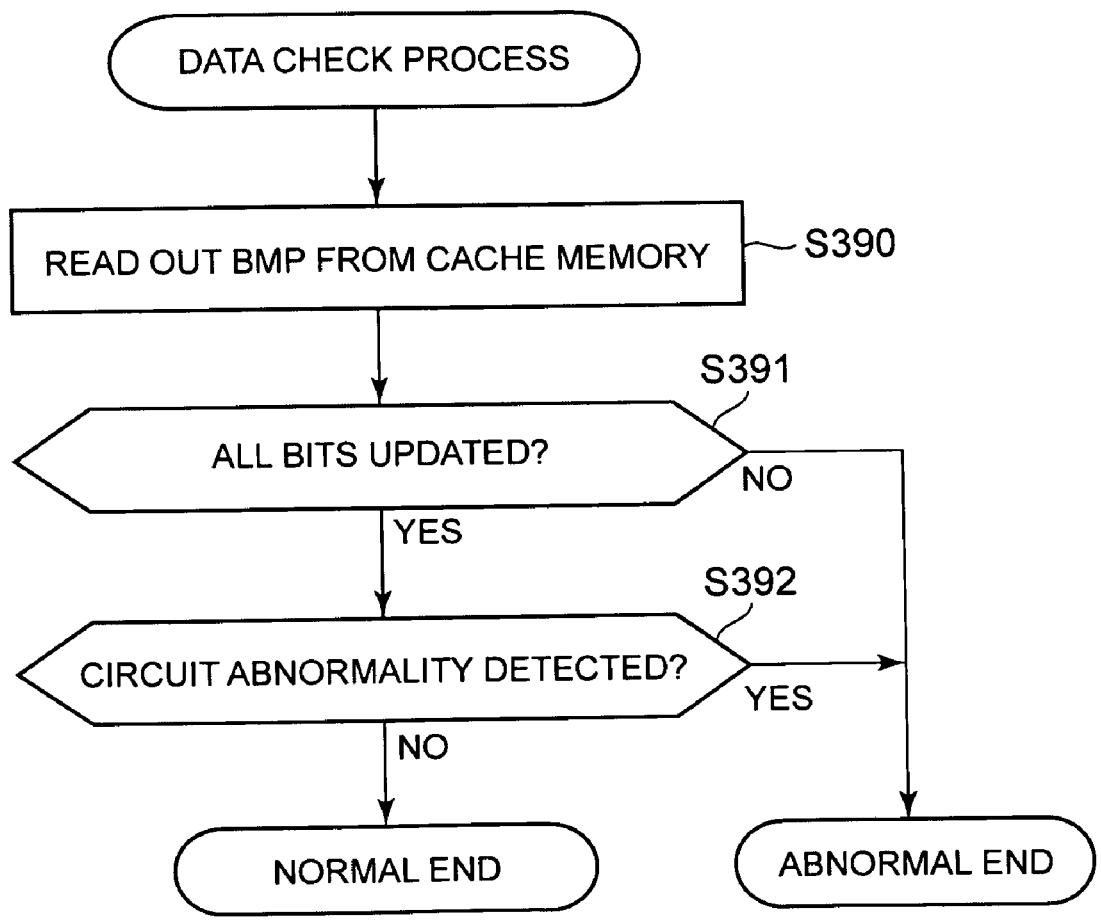
FIG. 14 is a flowchart of the data check process shown in S39 of FIG. 13.

FIG. 14 is a flowchart of the data check process shown in S39 of FIG. 13. The bitmap control circuit 120 reads out the bitmap corresponding to the data received in S31 from the cache memory 14 (S390). Furthermore, the configuration can be such that the bitmap is read out from the bitmap buffer 121 without being read out from the cache memory 14.

The bitmap control circuit 120 determines whether or not the value "1", which shows that the data has been received, is configured in all the bits of the read-out bitmap (S391). If there is even one bit that has not been updated (S391: NO), in other words, if there is even one bit for which a "1" has not been configured (S391: NO), the data transfer process is ended abnormally.

When all the bits of the bitmap have been updated (S391: YES), in other words, when "1" has been configured in all the bits of the bitmap (S391: YES), the transfer circuit 110A determines whether or not a circuit abnormality has been detected (S392). As described in the first embodiment, when data is moved while monitoring the BCC value, and a circuit abnormality resulting from a BCC change is detected, a flag showing the detection of a circuit abnormality is set.

When a circuit abnormality is not detected (S392: NO), the data transfer process is ended normally. When a circuit abnormality is detected (S392: YES), the data transfer process is ended abnormally.

Configuring this embodiment like this exhibits the same effect as that of the first embodiment. In this embodiment, since a bitmap is used to manage whether or not write-data has been stored in the cache memory 14, data consistency can be determined more accurately than in the first embodiment.

In the case of the first embodiment, for example, there remains the likelihood that a BCC of a location to which data has been written a plurality of times and a BCC of a location to which data has not been written even one time will haphazardly coincide with the BCC of correct data. In this case, it is not possible to detect a data transfer error in the first embodiment. By contrast, in this embodiment, since the determination as to whether or not write-data has been written to the cache memory 14 is managed using a prescribed size (one byte units), it is possible to accurately determine whether or not a data transfer was carried out normally.

Embodiment 3

A third embodiment will be explained on the basis of FIGS. 15 through 20. In this embodiment, the address of data transferred to the cache memory 14 is managed as a log address, and the determination as to whether or not data has been stored in the cache memory 14 normally is made on the basis of the log address.

Figure 15:
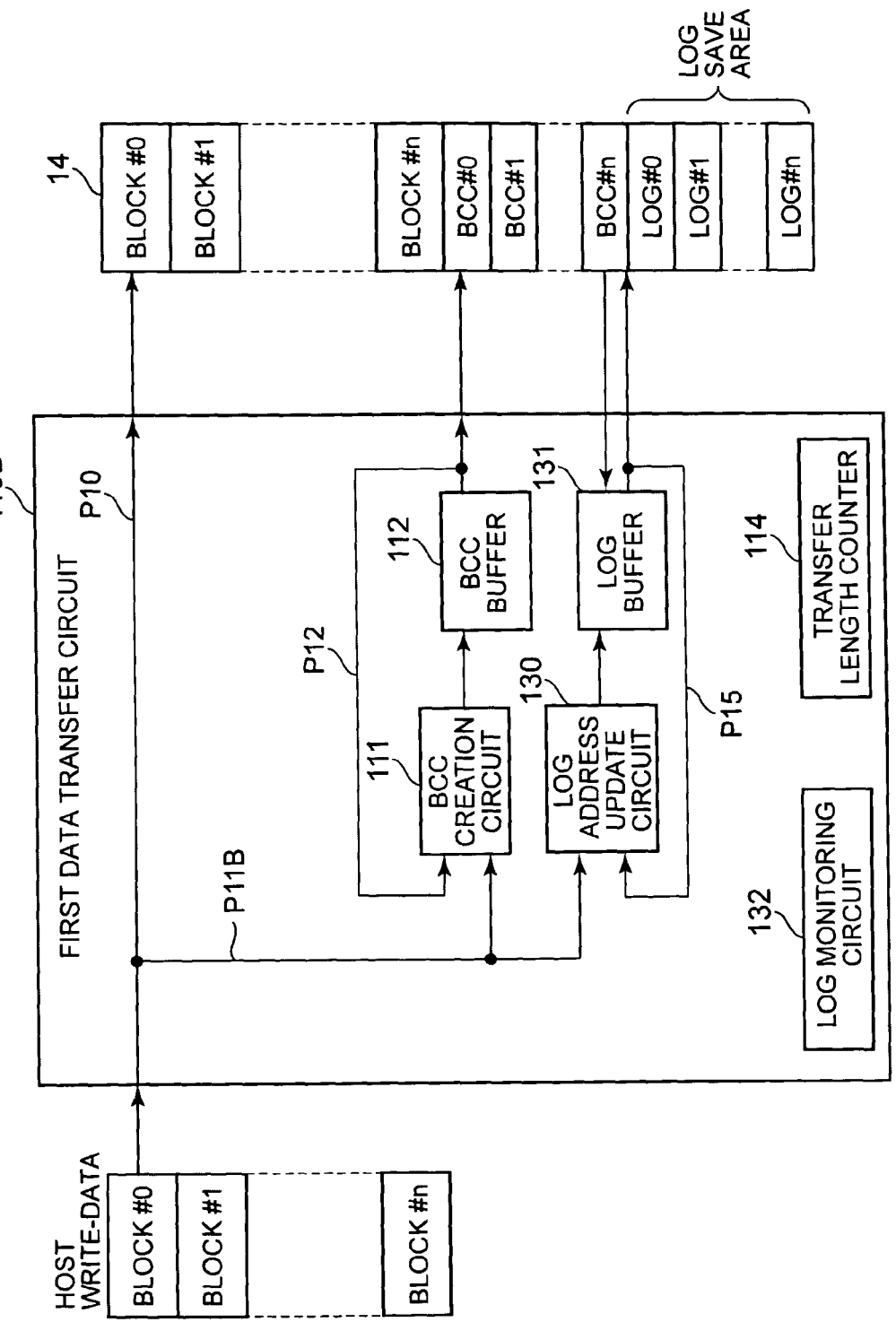
FIG. 15 is a block diagram showing the configuration of a data transfer circuit related to a third embodiment.

FIG. 15 shows a transfer circuit 100B according to this embodiment. This transfer circuit 110B, for example, comprises a BCC creation circuit 111; BCC buffer 112; transfer length counter 114; log address update circuit 130; log buffer 131; and log monitoring circuit 132.

Write-data from the host 30 is transferred via path P10 and stored in the cache memory 14. Further, the write-data from the host 30 is respectively inputted to the BCC creation circuit 111 and log address update circuit 130 via a path P11B. The log address update circuit 130 can read out a log address stored in the log buffer 131 via a path P15.

Logs respectively corresponding to a plurality of write commands is stored in the cache memory 14. For example, log #0 corresponds to write command #0, log #1 corresponds to write command #1, and log #2 corresponds to write command #2. In other words, a log address is used to manage the from-where-to-where range within which a write command is written to the cache memory 14 for each write command. The log monitoring circuit 132, as will be described hereinbelow, configures a log (log address) in accordance with the number of the write command in the log buffer 131.

FIG. 16 shows how data consistency is determined on the basis of a log address. Log addresses corresponding to the respective write commands are configured in the log buffer 131.

The log buffer 131, for example, has 16 entries. Each entry comprises a start address (SADR) and an end address (EADR). In other words, the log buffer 131 is capable of managing 16 pairs of start addresses and end addresses.

The size of a start address and the size of an end address is two bytes, respectively. The respective start addresses and end addresses, for example, comprise 16 bits (two bytes) comprising a validation bit D10 (one bit) showing whether or not the address is valid; an unused reserved bit D11 (one bit); and bits for storing an address D12 (14 bits).

Figure 17A:
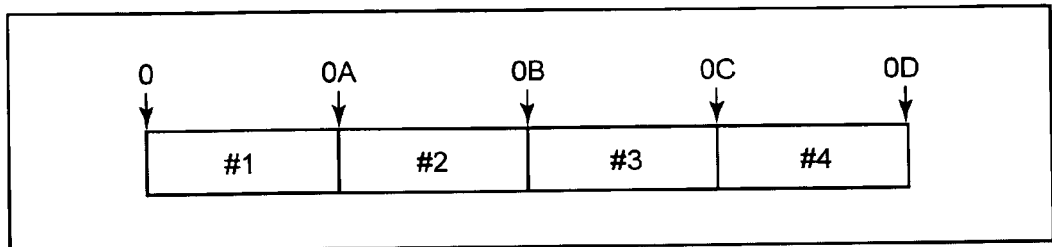
FIG. 17 is a schematic diagram showing how a log address is updated in accordance with the arrival of received data.
Figure 17B:
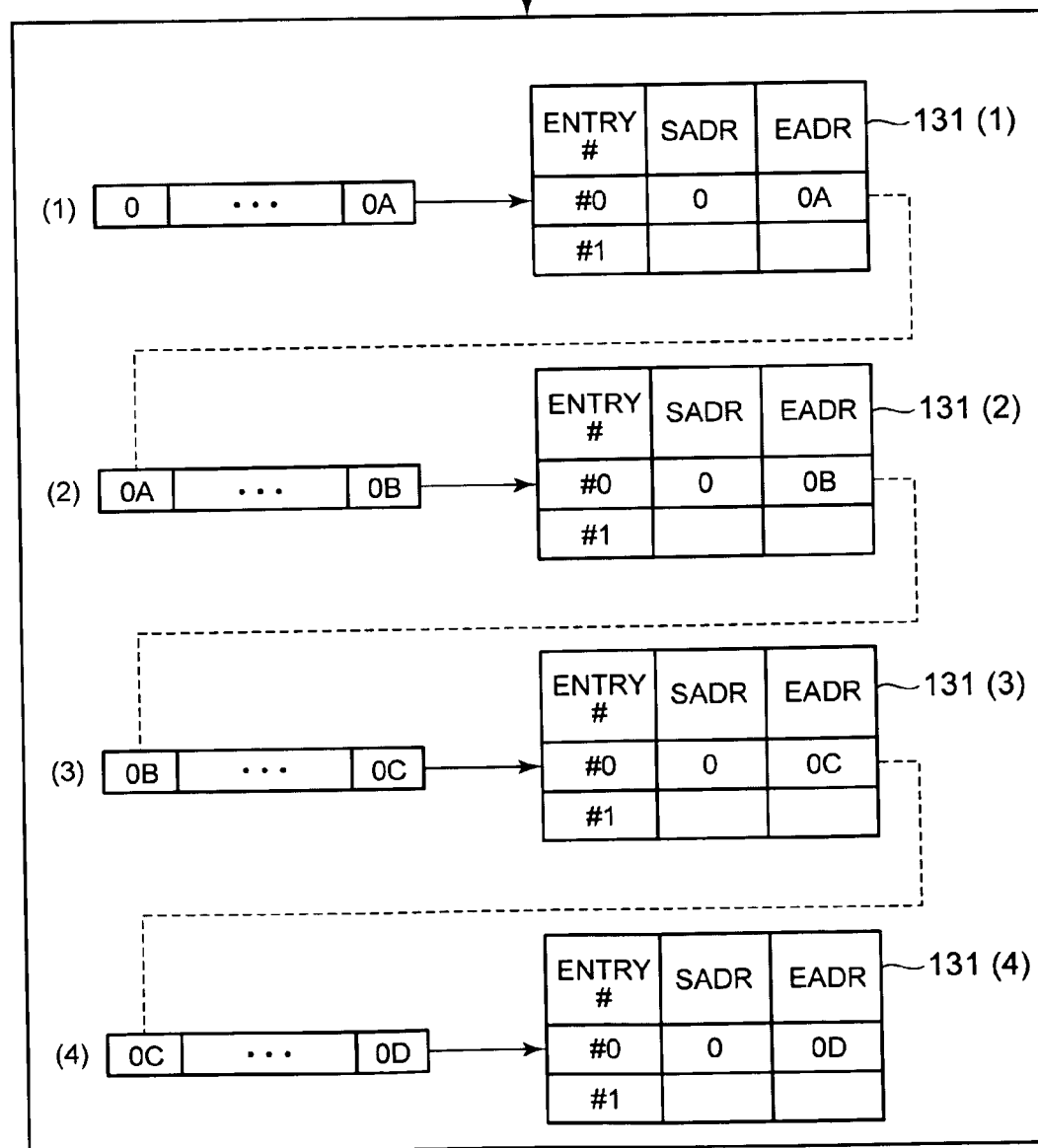
Figure 18A:
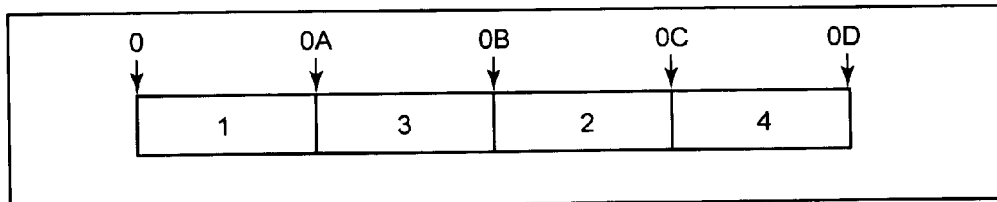
FIG. 18 is a schematic diagram showing how a log address is updated when the arrival order of received data has been transposed.

As described in FIGS. 17 and 18, when first data is inputted to the transfer circuit 110B, the start address and end address of this first data are respectively detected, and registered in a free entry (for example, entry #0) of the log buffer 131.

When second data is inputted to the transfer circuit 110B, the start address and end address of the second data are respectively detected. Then, the start address and end address of the second data are compared against the start address and end address of the first data.

When data is inputted to the transfer circuit 110B in order, the first data end address matches the second data start address. A range of data from the first data start address to the second data end address is stored in the cache memory 14. Accordingly, the log address update circuit 130 updates the end address of the first data to the end address of the second data.

If any of the first data start address and end address and second data start address and end address do not match, the second data start address and end address are registered in a free entry (for example, entry #1) inside the log buffer 131.

When a third data is inputted to the transfer circuit 110B, the third data start address and end address are respectively detected. The third start address and end address are compared against the respective addresses registered in the respective entries of the log buffer 131. When it is determined that the third data is the continuation of data already stored in the cache memory 14, either the start address or end address registered in the log buffer 131 is updated.

When the transfer circuit 110B has correctly received all the data of a size specified by a write command, in other words, when all scheduled data has been stored in the cache memory 14 regardless of the transfer order thereof, a prescribed size worth of write-data from the start address is stored in the cache memory 14. Therefore, only one start address and one end address are stored in the log buffer 131.

When a plurality of effective entries exist inside the log buffer 131, for example, a portion of the data may have been lost, or the same data may have been duplicatively written. Therefore, when a plurality of effective entries remains in the log buffer 131, a determination can be made that an abnormality occurred in the data transfer to the cache memory 14.

The way of changing an address managed by the log buffer 131 will be explained by referring to FIGS. 17 and 18. FIG. 17A shows the write-data structure that constitutes the premise of the explanation. The write-data, which is used for the explanation, has a total of four logical blocks #1 through #4.

The first logical block's start address is "0" and its end address is "0A". The second logical block's start address is "0A" and its end address is "0B". The third logical block's start address is "0B" and its end address is "0C". The fourth logical block's start address is "0C" and its end address is "0D".

FIG. 17B shows a situation in which four logical blocks are transferred in order to the cache memory 14. As shown in (1) of FIG. 17B, when the initial logical block (0-0A) is inputted to the transfer circuit 10B, the start address (0) and end address (0A) of this logical block are recorded in entry #0 of the log buffer 131(1).

FIG. 17B (2) shows a situation in which the second logical block (0A-0B) is inputted to the transfer circuit 110B. The log address update circuit 130 compares the start address (0A) and end address (0B) of the second logical block against the start address (0) and the end address (0A) recorded in the log buffer 131.

In this case, since the second logical block's start address (0A) matches the end address (0A) recorded in entry #0, the log address update circuit 130 rewrites the end address of entry #0 to "0B". This is because data from address "0" to address "0B" is stored in the cache memory 14.

Similarly, as shown in FIG. 17B (3), when the third logical block (0B-0C) is inputted to the transfer circuit 110B, the log address update circuit 130 rewrites the entry #0 end address from "0B" through "0C".

Similarly, as shown in FIG. 17B (4), when the fourth logical block (0C-0D) is inputted to the transfer circuit 110B, the log address update circuit 130 rewrites the entry #0 end address from "0C" through "0D".

FIG. 18 is a schematic diagram showing a situation in which the order of the data transferred to the cache memory 14 has been transposed. In the example of FIG. 18, it is supposed that data is inputted to the transfer circuit 110B in the order of first logical block (0-0A)→third logical block (0B-0C)→second logical block (0A-0B)→fourth logical block (0C-0D). However, only one part of the transfer order has been transposed, and all of the data itself has been transferred to the cache memory 14.

Figure 18B:
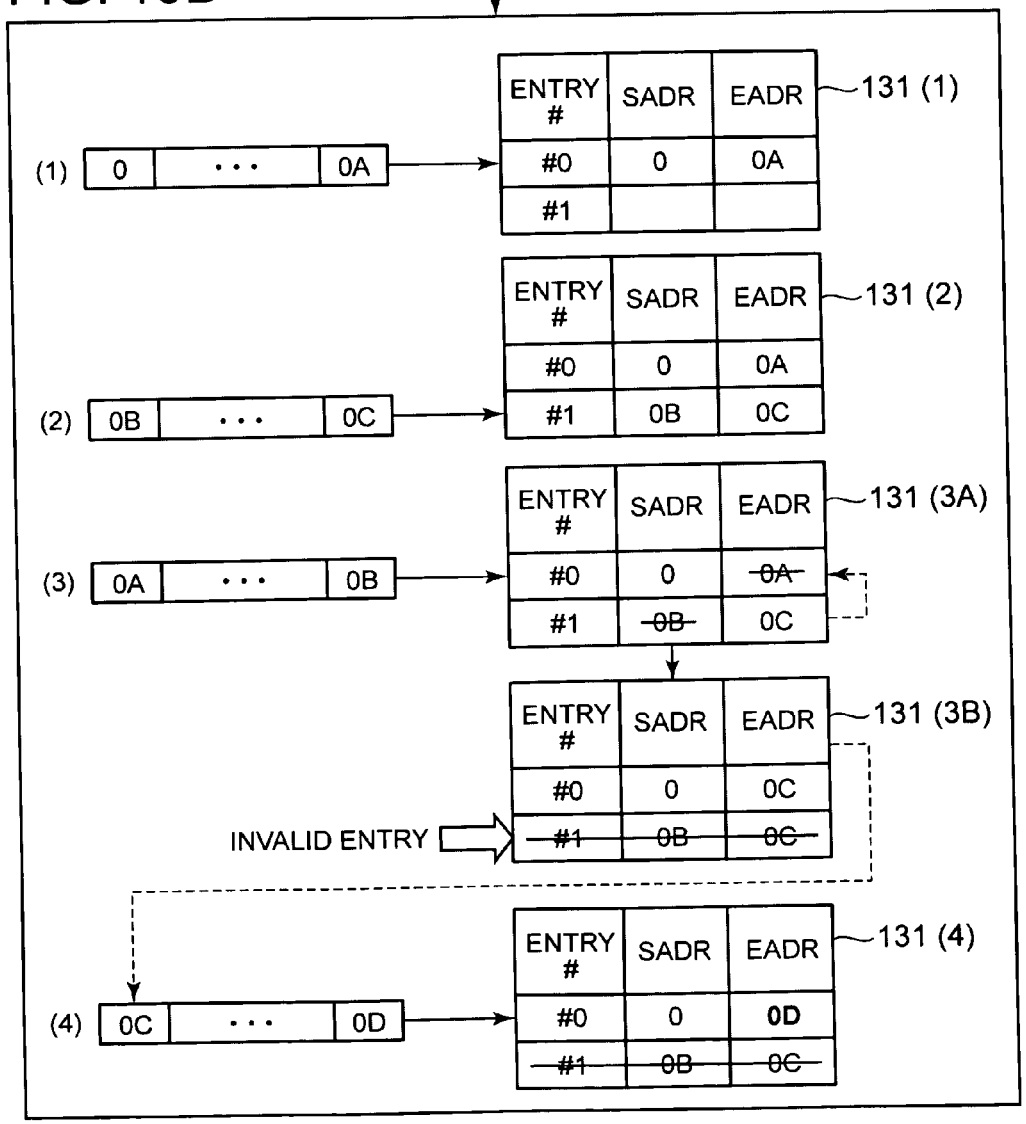

As shown in FIG. 18B (1), when logical block (0-0A) is inputted, the start address (0) and the end address (0A) are registered in entry #0 of the log buffer 131.

As shown in FIG. 18B (2), when logical block (0B-0C) is inputted, the start address (0B) and end address (0C) are registered in entry #1 of the log buffer 131. This is because the start address (0B) and the end address (0C) of the logical block (0B-0C) do not coincide with either the start address (0) or the end address (0A) that have already been registered. Therefore, a new entry #1 is used in addition to the existing entry #0.

FIG. 18B (3) shows the situation when logical block (0A-0B) is inputted. The start address (0A) of this logical block matches the end address (0A) registered in entry #0. Further, the end address (0B) of this logical block matches the start address (0B) registered in entry #1.

That is, in accordance with the arrival of logical block (0A-0B), the gap in the data stored in the cache memory 14 is filled in, and continuous data from start address "0" to end address "0C" is stored in the cache memory 14.

Accordingly, the log address update circuit 130 updates the end address "0A" of entry #0 to the end address "#0C" of entry #1, and, in addition, invalidates entry #1. The respective validation bits D10 of the start address and end address registered in entry #1 are configured to invalid.

FIG. 18B (4) shows the situation when logical block (0C-0D) is inputted. Since the start address (0C) of this logical block matches the end address (0C) of entry #0, the end address of entry #0 is changed from "0C" through "0D".

Figure 19:
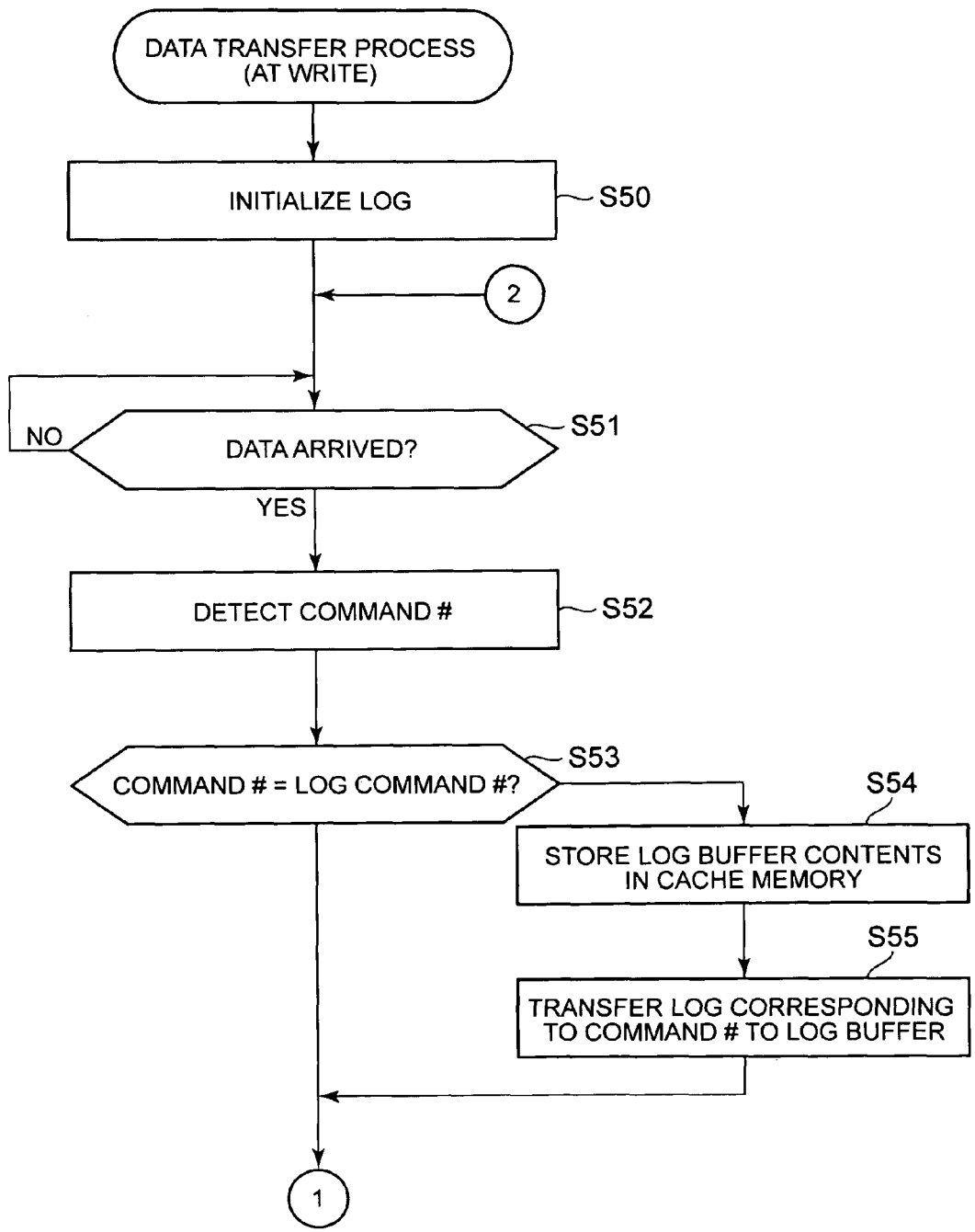
FIG. 19 is a flowchart of a data transfer process.
Figure 20:
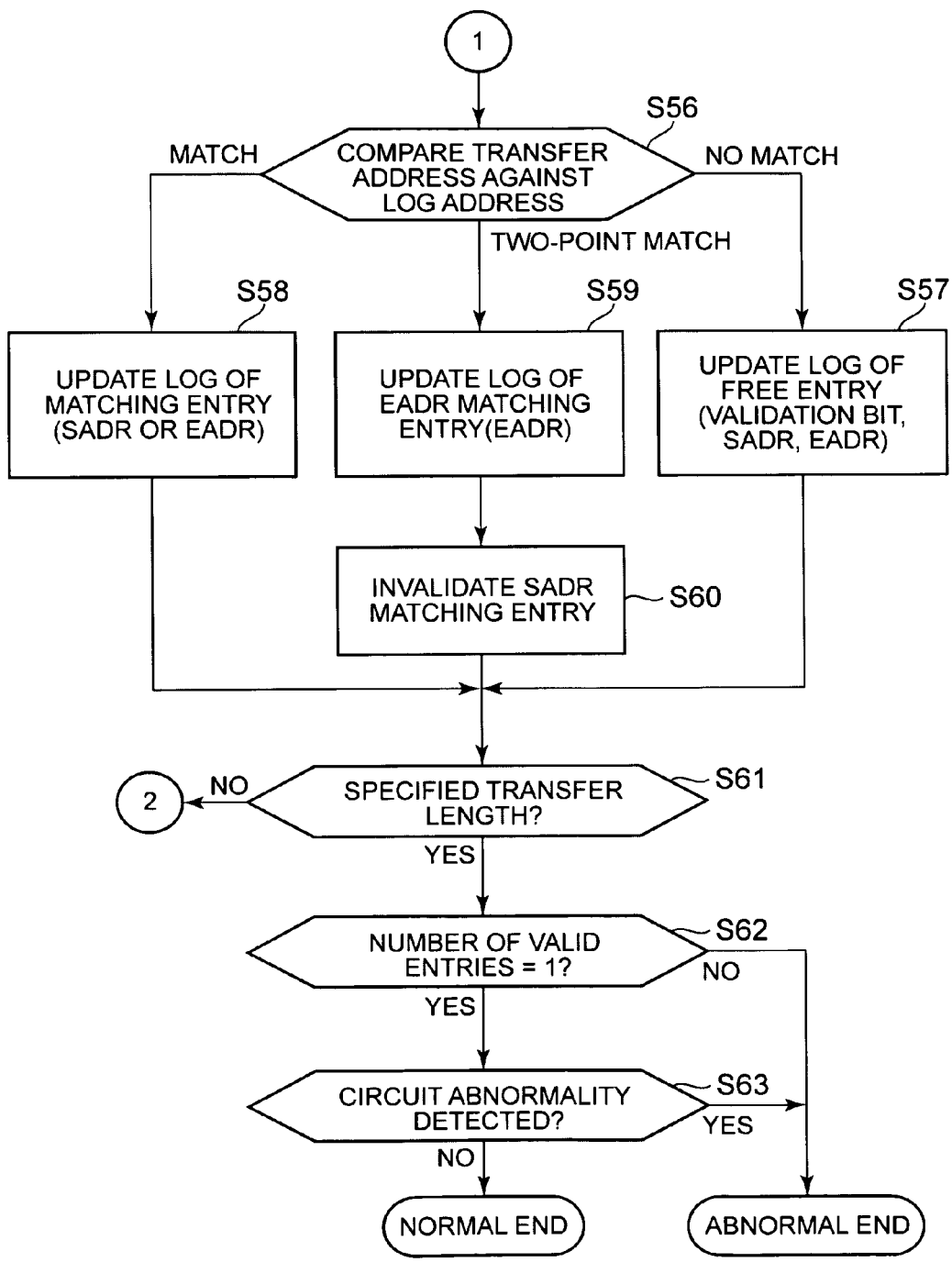
FIG. 20 is a continuation of FIG. 19.

FIGS. 19 and 20 are flowcharts of the data transfer process. The log address update circuit 130 initializes the log buffer 131 (S50), and waits for data to be inputted from the host communication controller 11 (S51).

When data is inputted (S51: YES), the log monitoring circuit 132 detects the number of the command (in other words, the write command) related to this data transfer (S52). As described hereinabove, the transfer circuit 110B can multiplex and process a plurality of commands. Log addresses corresponding to the respective write commands are read out from the cache memory 14 and configured in the log buffer 131.

The log monitoring circuit 132 compares the command number of the log address configured in the log buffer 131 against the number of the write command related to the write-data received in S51 (S53). When the two command numbers do not match (S53: NO), the log monitoring circuit 132 saves the log address stored in the log buffer 131 to a prescribed area inside the cache memory 14 (S54). Next, the log monitoring circuit 132 reads out the log address that corresponds to the command number detected in S52 from the cache memory 14, and transfers this log address to the log buffer 131 (S55). Consequently, the log address corresponding to the command number detected in S52 is configured in the log buffer 131.

By contrast, when the command number detected in S52 matches the command number that corresponds to the log address stored in the log buffer 131 (S53: YES), S54 and S55 are skipped, and processing moves to S56 shown in FIG. 20.

The log address update circuit 130 compares the address of the data received in S51 against the log address stored in the log buffer 131 (S56). The address of the data received in S51 may be called the transfer address. The transfer address comprises a start address and an end address.

The result of comparing the transfer address against the log address can fall into one of the following three categories. The first is when the transfer address and log address do not match at all; the second is when the transfer address and log address match at one point; and the third is when the transfer address and log address match at two points.

The first category will be explained (S57). As shown in FIG. 18B (2), when the transfer address (0B-0C) of the received data does not match with any part of the log address (0-0A), the transfer address (0B-0C) is configured in a free entry #1. In other words, one free entry #1 inside the log buffer 131 is selected, and the start address (0B) and the end address (0C) of the transfer address are registered in entry #1. Furthermore, the validation bits D10 of the start address (0B) and the end address (0C) are configured to valid.

The second category will be explained (S58). As shown in FIG. 17B (2), the start address (0A) of the transfer address (0A-0B) of the received data matches the end address (0A) of entry #0. Accordingly, the log address update circuit 130 updates the entry #0 end address (0A) to the end address (0B) of the received data.

The third category will be explained (S59). As shown in FIG. 18B (3), the transfer address (0A-0B) of the received data matches the end address (0A) of entry #0 and the start address (0B) of entry #1. In other words, the transfer address matches the log address at two points. In this case, the log address update circuit 130 updates the end address "0A" of entry #0, which matches the end address, to the end address "0C" of the entry, which matches the start address (S59). Then, the log address update circuit 130 configures to validation bit D10 of entry #1 that matches the start address to invalid, thereby invalidating this entry #1 (S60).

Steps S51 through S60 are repeated until the value of the transfer length counter 114 reaches the size specified by the write command. When data of the size specified by the write command is received (S61: YES), the transfer circuit 110B determines whether or not the number of valid entries inside the log buffer 131 is 1 (S62).

As shown in FIGS. 18B (3) and (4), when all to the data specified by the write command has been transferred to the cache memory 14, there is only one valid entry in the log buffer 131. When a plurality of valid entries exists, it is a state in which the data has been divided, and a portion of the data has yet to be received.

When the number of valid entries is 1 (S62: YES), the transfer circuit 110B determines whether or not a circuit abnormality has been detected (S63). When a circuit abnormality has not been detected (S63: NO), the data transfer to the cache memory 14 ends normally. When a circuit abnormality has been detected (S63: YES), or when the number of valid entries is not 1 (S62: NO), the data transfer to the cache memory 14 ends abnormally. In the case on an abnormal end, the host 30 reissues the write command and resends the write-data.

Configuring this embodiment like this exhibits the same effects as that of the first embodiment. Furthermore, in this embodiment, the address of data transferred to the cache memory 14 is managed by a log buffer 131, and data consistency is checked on the basis of the continuity of the addresses of the data stored in the cache memory 14 and the data size. Therefore, data consistency can be determined with higher reliability than in the first embodiment. Further, the size of the log buffer 131 can be made smaller than when data reception is managed using a bitmap as in the second embodiment.

The number of entries in the log buffer 131 can be configured in accordance with the frequency with which an out-of-order state occurs. For example, as one example, around 16 entries are prepared beforehand. If an out-of-order state occurs more than 16 times, the data transfer can be ended abnormally as a failure, and the host 30 can retry the data transfer.

Embodiment 4

Figure 21:
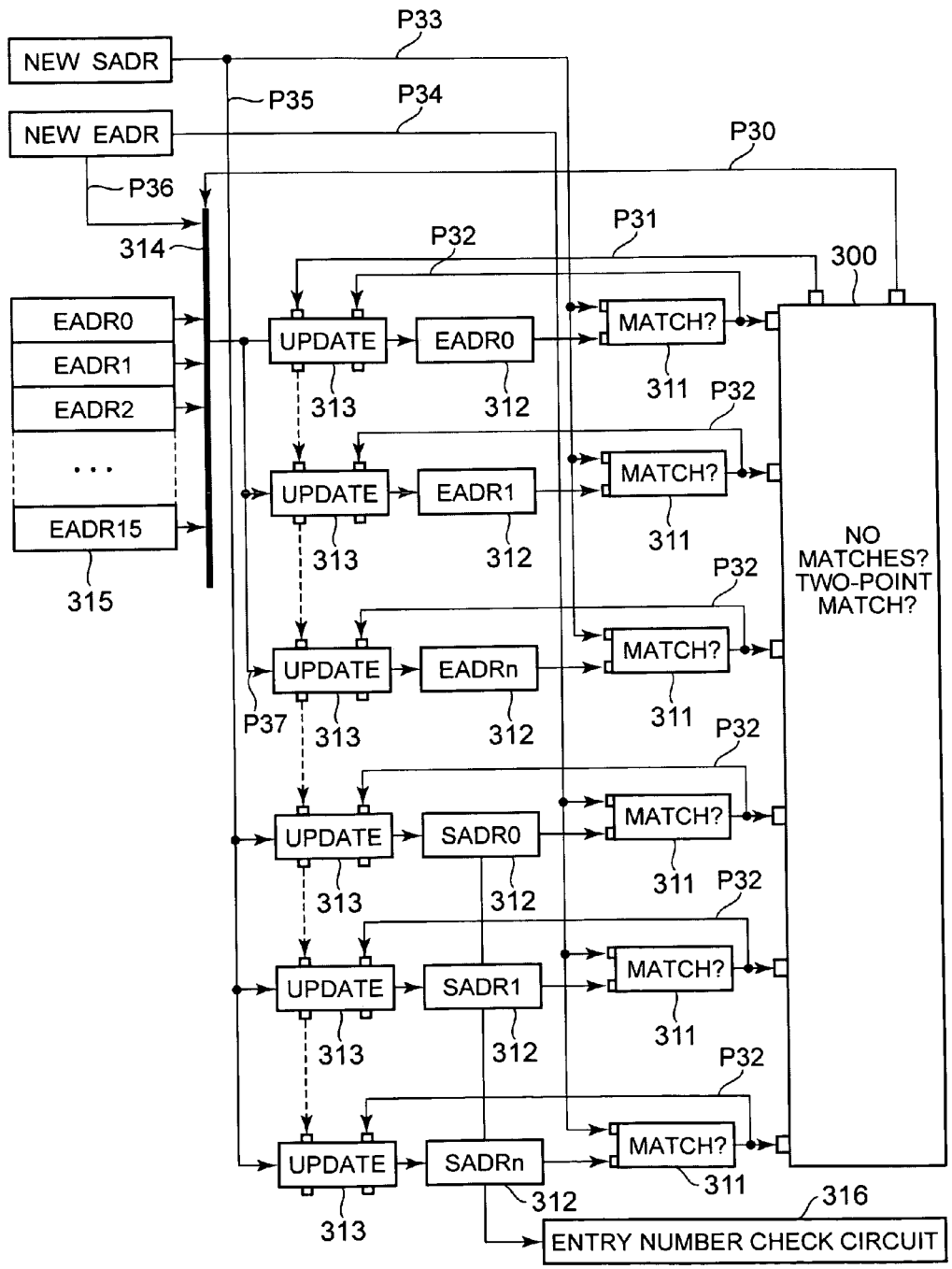
FIG. 21 is a circuit diagram respectively showing concrete examples of a log address update circuit and log buffer related to a fourth embodiment.

A fourth embodiment of the present invention will be explained on the basis of FIG. 21. This embodiment corresponds to a specific example of the third embodiment. In this embodiment, the management of a log address described in the third embodiment is realized by a hardware circuit.

This circuit, for example, comprises a match location determination circuit 300; a match determination circuit 311; an address buffer 312; an update circuit 313; and an entry number check circuit 316.

The match location determination circuit 300 is the circuit that corresponds to S56 of FIG. 20. The match location determination circuit 300 compares the address (transfer address) of data inputted to the transfer circuit 110B against an address stored in the address buffer 312, and determines if there is no match between the two addresses, or if the two address match at one point, or if the two addresses match at two points.

Either one of the start address or the end address is stored in the respective address buffers 312. The start address (SADR0) and the end address (EADR0) constitute a pair, and configures a single entry. Similarly, the start address (SADR1) and the end address EADR1, and the start address (SADRn) and the end address (EADRn) also respectively configure one entry each.

The match determination circuit 311 is for determining whether or not a log address stored in the address buffer 312 matches up with the newly inputted data address (transfer address). When there is no match, an indication for updating to be carried out is inputted to the update circuit 313 via a path P32.

When the transfer address and the log address are a complete mismatch, an update indication is inputted to the update circuit 313 of a prescribed address buffer 312 via a path P31. More specifically, an indication is outputted via P31 to store the start address (a new SADR) and end address (a new EADR) of the received data to the respective address buffers of a free entry. This indication is inputted to the update circuit 313 of a free address buffer 312.

When the transfer address and log address match up at two points, an update indication is inputted to an end address selector 314 via a path P30. Consequently, the end address, which matches the start address (new SADR) of the received data, is updated using end address 315 selected by the end address selector 314.

The entry number check circuit 316 corresponds to S62 of FIG. 20. This entry number check circuit 316 checks the number of valid entries. The number of valid entries can be detected by checking whether or not the start address of each entry is valid.

Configuring this embodiment like this exhibits the same effect as that of the third embodiment. In this embodiment, since a consistency check is realized using a hardware circuit on the basis of a log address, transfer processing can be carried out even faster.

Embodiment 5

Figure 22:
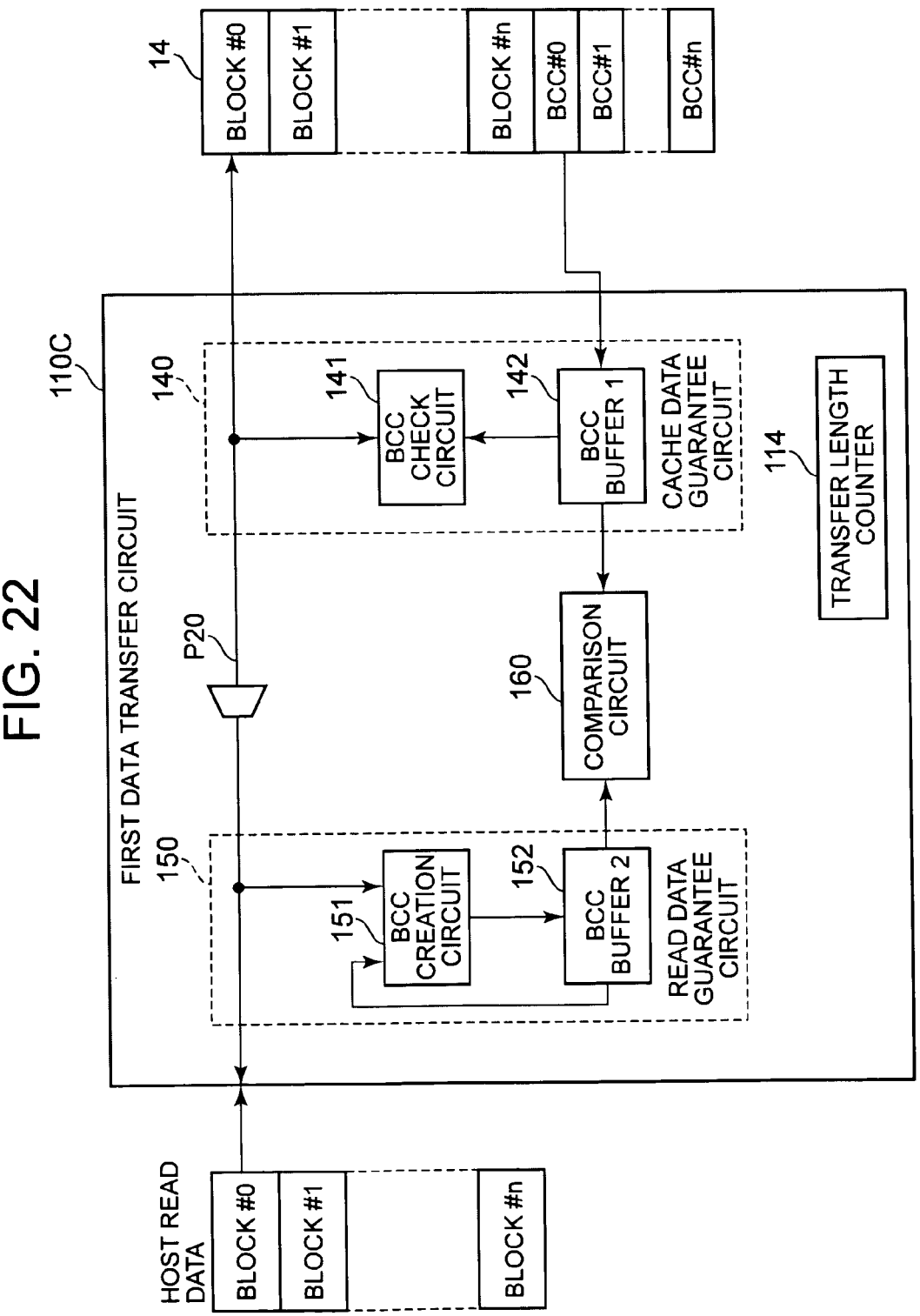
FIG. 22 is a block diagram showing the configuration of a data transfer circuit related to a fifth embodiment.

A fifth embodiment will be explained on the basis of FIGS. 22 and 23. This embodiment will be explained by giving an example in which data is read out from the cache memory 14. The host 30 can read out data from the storage controller 10 by issuing a read command.

When the read-requested data is stored in the cache memory 14, the data stored in the cache memory 14 is sent to the host 30. When the read-requested data is not stored in the cache memory 14, the data is read out from the logical volume 22, and stored in the cache memory 14.

The data, which has been stored in the cache memory. 14, is sent to the host 30 via the data transfer controller 15 and the host communication controller 11. It is possible to determine whether or not the data read out from the cache memory 14 was transferred normally to the host 30 during this read process as well.

A transfer circuit 110C, for example, comprises a cache data guarantee circuit 140; a read data guarantee circuit 150; a comparator 160; and a transfer length counter 114. The cache data guarantee circuit 140 is for guaranteeing that the data read out from the cache memory 14 is correct. The read data guarantee circuit 150 is for guaranteeing that the data (read data) transferred to the host 30 is correct.

The cache data guarantee circuit 140 comprises a BCC check circuit 141; and a BCC buffer 142. The BCC buffer 142 stores the data to be read out from the cache memory 14.

When the data is read out from the cache memory 14, the BCC check circuit 141 calculates anew a BCC for each logical block based on the read-out cache data, and compares the newly calculated BCC against the BCC stored in the BCC buffer 142. When the two BCC are a match, a determination is made that the cache data was read out correctly from the cache memory 14.

The data read out from the cache memory 14 is transferred to the host communication controller 11 via a path P20. A BCC creation circuit 151 of the read data guarantee circuit 150 computes the BCC of the data to be transferred to the host 30 in proportion to the read transfer size and stores this computation result in a BCC buffer 152.

When the transfer of data of the size specified by the read command is complete, the comparator 160 compares the BCC stored in BCC buffer 142 against the BCC stored in BCC buffer 152. When the two BCC are a match, a determination is made that the read data was transferred normally without duplication or omissions.

Figure 23:
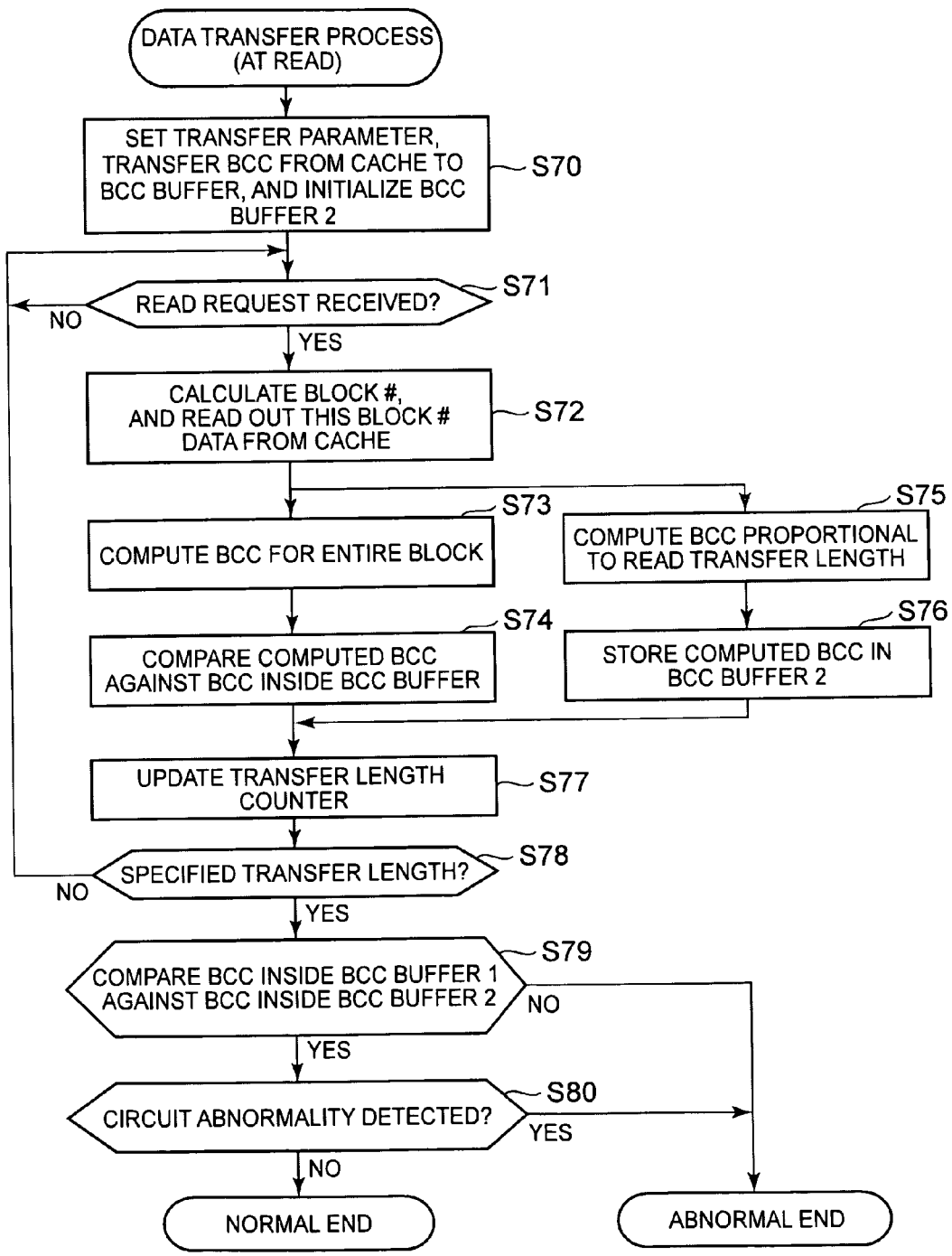
FIG. 23 is a flowchart of a data transfer process.

FIG. 23 is a flowchart showing a data transfer process during a read process. The transfer circuit 110C sets a transfer parameter, and transfers the BCC stored in the cache memory 14 to BCC buffer 142 (S70). Further, the transfer circuit 110C initializes BCC buffer 152 (S70).

The transfer circuit 110C determines whether or not a read request has been received (S71). When a read request has been received (S71: YES), the transfer circuit 110C calculates the block number of the read-requested data, and reads out the data of this calculated logical block from the cache memory 14 (S72). Next, cache data guarantee processing (S73 and S74) and read data guarantee processing (S75 and S76) are executed in parallel.

In the cache data guarantee processing, a BCC is calculated for the logical block to be read out from the cache memory 14 (S73). The calculated BCC is compared against the BCC stored in BCC buffer 142 (S74). If the BCC do not match at this time, processing is ended as a transfer failure.

In the read date guarantee processing, a BCC proportional to the read-requested size is calculated (S75), and the calculated BCC is stored in BCC buffer 152 (S76).

The transfer length counter 114 updates the count value. The transfer circuit 110C repeatedly executes steps S71 through S77 until data of the size specified by the read command has been read out (S78). When the value of the transfer length counter 114 reaches the specified size (S78: YES), the transfer circuit 110C compares the BCC stored in BCC buffer 142 (BCC buffer 1 in the figure) against the BCC stored in BCC buffer 152 (BCC buffer 2 in the figure) (S79).

When the two BCC are a match (S79: YES), the transfer circuit 110C determines whether or not a circuit abnormality has occurred (S80). When a circuit abnormality has not been detected (S80: NO), the data transfer ends normally.

By contrast, when either the BCC of BCC buffer 142 does not match the BCC of BCC buffer 152 (S79: NO) or a circuit abnormality has been detected (S80: YES), the data transfer ends abnormally. The host 30 can request the desired data by reissuing a read command.

Configuring this embodiment like this exhibits the same effects as that of the first embodiment. Furthermore, in this embodiment, it is possible to check data consistency even when data is read out from the cache memory 14, thereby further enhancing usability and reliability.

Furthermore, the present invention is not limited to the embodiments described hereinabove. A person having ordinary skill in the art can make various additions and changes within the scope of the present invention. A person having ordinary skill in the art will also be able to combine the above-mentioned embodiments as deemed appropriate. Further, for example, the explanations focused on a first data transfer circuit, but a second data transfer circuit can also be provided with functions for checking data consistency.

What is claimed is:

1. A data transfer controller for controlling a data transfer to a cache memory when the data transfer to the cache memory can be executed discontinuously, the data transfer controller comprising:

a check data creation module for creating check data for detecting a data error in received data;

a check data storage module for temporarily storing the created check data;

a data consistency determination module for determining a consistency of data stored in the cache memory, based on the created check data, which determines whether or not the data stored in the cache memory matches a specified size, which is specified beforehand, and whether or not a continuity of the data is maintained; and a first data transfer control circuit configured to execute the check data creation module, the check data storage module and the data consistency determination module;

wherein the data consistency determination module determines whether or not data read out from the cache memory matches a different specified size, which is specified beforehand, and whether or not the continuity of the read-out data is maintained; and wherein the data consistency determination module compares third check data, which is created when data of the different specified size is read out from the cache memory, against fourth check data, which is created when the data of the different specified size is sent to the outside, and determines that the data read out from the cache memory and the sent data has consistency when the third check data matches the fourth check data.

2. The data transfer controller according to claim 1, wherein the data consistency determination module compares first check data, which is created when data of the specified size is stored in the cache memory, against second check data, which is created when the data of the specified size is read out from the cache memory, and determines that the data stored in the cache memory has consistency when the first check data matches the second check data.

3. The data transfer controller according to claim 2, wherein the first check data is created by the check data creation module and stored in the check data storage module, the second check data is created by a data check circuit, and the data check circuit compares the first check data stored in the check data storage module against the second check data, and determines that the data stored in the cache memory has consistency when the first check data matches the second check data.

4. The data transfer controller according to claim 1, wherein the data consistency determination module comprises a bitmap creation module for creating a bitmap for managing the data stored in the cache memory in units of a prescribed size, and a bitmap check module for determining the consistency of the data stored in the cache memory on the basis of the bitmap.

5. The data transfer controller according to claim 1, wherein the data consistency determination module comprises a log manager for managing a log, which shows an address of the data stored in the cache memory, and a log check module for determining the consistency of the data stored in the cache memory on the basis of the log.

6. The data transfer controller according to claim 5, wherein the log manager updates an address inside the log by comparing the address of data to be transferred to the cache memory against the address of data already stored in the cache memory, and the log check module determines that the data stored in the cache memory has consistency when there is only one entry in the log.

7. The data transfer controller according to claim 1, wherein a work area used by the data consistency determination module is provided in the cache memory.

8. A data consistency determination method for determining a consistency of data transferred to a cache memory when a data transfer to the cache memory can be executed discontinuously, the method comprising the steps of:

transferring received data to the cache memory;

creating determination data for the data transferred to the cache memory;

storing the created determination data;

determining whether or not the data has been transferred to the cache memory in proportion to a specified size, which is specified beforehand; and determining the consistency of the data, which has been transferred to the cache memory and stored in the cache memory, based on the stored determination data, when it is determined that the specified-size data has been transferred to the cache memory; and determining whether or not data read out from the cache memory matches a different specified size, which is specified beforehand, and whether or not the continuity of the read-out data is maintained; and comparing third check data, which is created when data of the different specified size is read out from the cache memory, against fourth check data, which is created when the data of the different specified size is sent outside, and determining that the data read out from the cache memory and the sent data has consistency when the third check data matches the fourth check data.

9. The data consistency determination method according to claim 8, wherein the determination data comprises any one of (A) check data for detecting an error in the data stored in the cache memory, (B) a bitmap for managing the presence or absence of data stored in the cache memory in units of a prescribed size, or (C) a log of an address of the data stored in the cache memory, and in the step of determining the consistency of the data, (a) when the determination data is configured as the check data, first check data, which is created when the data is stored in the cache memory, is compared against second check data, which is created when the data is read out from the cache memory, and it is determined that the data stored in the cache memory has consistency when the first check data matches the second check data, (b) when the determination data is configured as the bitmap, it is determined that the data stored in the cache memory has consistency when bits, which show that data has been stored, are respectively configured in all of the bitmaps, and (c) when the determination data is configured as the log, it is determined that the data stored in the cache memory has consistency when a start address and an end address shown in the log match a start address and an end address corresponding to a specified size, which is specified beforehand.

10. A storage controller for controlling an exchange of data between a host computer and a storage device, comprising:

a first communication controller for executing communications with the host computer;

a second communication controller for executing communications with the storage device; and a data transfer controller, which is disposed between the first communication controller and the second communication controller, respectively controls data transfers between the cache memory and the first communication controller and the second communication controller, and is able to execute a data transfer from the first communication controller to the cache memory discontinuously, the data transfer controller comprising:
- a check data creation module for creating check data for detecting a data error in received data;
- a check data storage module for temporarily storing the created check data;
- a data consistency determination module for determining a consistency of data stored in the cache memory, based on the created check data, which determines whether or not the data stored in the cache memory matches a specified size, which is specified beforehand, and whether or not a continuity of the data is maintained; and
- a first data transfer control circuit configured to execute the check data creation module, the check data storage module and the data consistency determination module;
- wherein the data consistency determination module can also determine whether or not data read out from the cache memory matches a different specified size, which is specified beforehand, and whether or not the continuity of the read-out data is maintained; and
- wherein the data consistency determination module compares third check data, which is created when data of the different specified size is read out from the cache memory, against fourth check data, which is created when the data of the different specified size is sent to the outside, and determines that the data read out from the cache memory and sent has consistency when the third check data matches the fourth check data.

11. A data transfer controller for controlling a data transfer to a cache memory when the data transfer to the cache memory can be executed discontinuously, the data transfer controller comprising:
- a check data creation module for creating check data for detecting a data error in received data;
- a check data storage module for temporarily storing the created check data;
- a data consistency determination module for determining a consistency of data stored in the cache memory, based on the created check data, which determines whether or not the data stored in the cache memory matches a specified size, which is specified beforehand, and whether or not a continuity of the data is maintained; and
- a first data transfer control circuit configured to execute the check data creation module, the check data storage module and the data consistency determination module;
- wherein the data consistency determination module compares first check data, which is created when data of the specified size is stored in the cache memory, against second check data, which is created when the data of the specified size is read out from the cache memory, and determines that the data stored in the cache memory has consistency when the first check data matches the second check data;
- wherein the first check data is created by the check data creation module and stored in the check data storage module,
- the second check data is created by a data check circuit, and
- the data check circuit compares the first check data stored in the check data storage module against the second check data, and determines that the data stored in the cache memory has consistency when the first check data matches the second check data.

12. A data transfer controller for controlling a data transfer to a cache memory when the data transfer to the cache memory can be executed discontinuously, the data transfer controller comprising:
- a check data creation module for creating check data for detecting a data error in received data;
- a check data storage module for temporarily storing the created check data;
- a data consistency determination module for determining a consistency of data stored in the cache memory, based on the created check data, which determines whether or not the data stored in the cache memory matches a specified size, which is specified beforehand, and whether or not a continuity of the data is maintained; and
- a first data transfer control circuit configured to execute the check data creation module, the check data storage module and the data consistency determination module;
- wherein the data consistency determination module comprises a bitmap creation module for creating a bitmap for managing the data stored in the cache memory in units of a prescribed size, and a bitmap check module for determining the consistency of the data stored in the cache memory on the basis of the bitmap.

* * * * *